(12) United States Patent
Sugawara et al.

(10) Patent No.: US 8,924,141 B2
(45) Date of Patent: Dec. 30, 2014

(54) INFORMATION PROVIDING APPARATUS

(75) Inventors: Hisashi Sugawara, Tokyo (JP);
Masayoshi Ono, Tokyo (JP); Shigeki Morita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 77 days.

(21) Appl. No.: 13/508,631

(22) PCT Filed: Mar. 19, 2010

(86) PCT No.: PCT/JP2010/001995
§ 371 (c)(1),
(2), (4) Date: May 8, 2012

(87) PCT Pub. No.: WO2011/114386
PCT Pub. Date: Sep. 22, 2011

(65) Prior Publication Data
US 2012/0232781 A1     Sep. 13, 2012

(51) Int. Cl.
*G01C 21/00* (2006.01)
*G08G 1/16* (2006.01)
*G01C 21/36* (2006.01)
*G08G 1/0967* (2006.01)

(52) U.S. Cl.
CPC ............ *G01C 21/3655* (2013.01); *G08G 1/163* (2013.01); *G01C 21/3691* (2013.01); *G08G 1/096783* (2013.01); *G08G 1/09675* (2013.01); *G01C 21/3697* (2013.01); *G08G 1/096716* (2013.01)
USPC .......................................................... 701/400

(58) Field of Classification Search
USPC .............................. 701/36, 300, 409–411, 455
See application file for complete search history.

(56) References Cited

U.S. PATENT DOCUMENTS

| 2008/0032663 | A1 | 2/2008 | Doyle |
| 2008/0243326 | A1 | 10/2008 | Dobler et al. |
| 2009/0143982 | A1 | 6/2009 | Katzer et al. |
| 2011/0254699 | A1 | 10/2011 | Sugawara et al. |

FOREIGN PATENT DOCUMENTS

| DE | 10338566 A1 | 3/2005 |
| DE | 10338566 A1 * | 3/2005 |
| DE | 10 2007 043 264 A1 | 3/2009 |
| DE | 10 2007 058 651 A1 | 6/2009 |
| DE | 102007058651 A1 * | 6/2009 |
| JP | 10-19594 A | 1/1998 |
| JP | 2000-348299 A | 12/2000 |
| JP | 2006-107148 A | 4/2006 |
| JP | 2006-267328 A | 10/2006 |

(Continued)

*Primary Examiner* — John Q Nguyen
*Assistant Examiner* — Rodney P King
(74) *Attorney, Agent, or Firm* — Birch, Stewart, Kolasch & Birch, LLP

(57) ABSTRACT

An information providing apparatus makes a decision, when an information providing deciding unit decides that driving support information is to be provided, as to whether the output of the voice information about the driving support information responding to a command from the information providing deciding unit and the output of the voice information about route guidance info nation responding to a command from a route guidance unit overlap each other or not, and controls, when they overlap each other, the output of voice information by an information providing output unit in such a manner as to prevent the output of the voice information about the driving support information from overlapping with the output of the voice information about the route guidance information.

13 Claims, 26 Drawing Sheets

(56) References Cited

FOREIGN PATENT DOCUMENTS

| JP | 2007-85987 A | 4/2007 |
| JP | 2009-58236 A | 3/2009 |
| JP | 2009-092964 | 4/2009 |
| JP | 2009-115617 A | 5/2009 |

* cited by examiner

FIG.3

| Service Name | Service Type | Service Name | Service Type |
|---|---|---|---|
| Accident Mode Information Providing Service | 1 | Right Turn Collision Information Providing Service | 7 |
| Stop Regulation Information Providing Service | 2 | Left Turn Catching Information Providing Service | 8 |
| Sudden Encounter Collision Information Providing Service | 3 | Pedestrian Crossing Information Providing Service | 9 |
| Speed Information Providing Service | 4 | Main Line Merging Support Information Providing Service | 10 |
| Oncoming Vehicle Approaching Information Providing Service | 5 | Rear-end Collision Prevention Information Providing Service | 11 |
| Danger Zone Avoidance Control Service | 6 | Signal Information Providing Service | 12 |

FIG.4

| Service Type | Degree of Priority | Reproduction Image | Reproduction Voice |
|---|---|---|---|
| 3: Sudden Encounter Collision Information Providing Service | 0,5~63 | Undefined | Undefined |
| | 1 | No Display | Non |
| | 2 | Reserved | Reserved |
| | 3 | In Service | Non |
| | 4 | Approaching Vehicle | Be Careful about Vehicle Approaching from Left |

FIG.8

| Service Type | Degree of Priority | Reproduction Ensured Period |
|---|---|---|
| 3: Sudden Encounter Collision Information Providing Service | 0, 5~63 | Undefined |
| | 1 | 0 |
| | 2 | Reserved |
| | 3 | 0 |
| | 4 | 4[sec] |

FIG.9

| Service Type | Number | Reproduction Image | Reproduction Voice |
|---|---|---|---|
| 21: Route Guidance Service | 0 | No Display | Non |
| | 1 | Left Turn Image | "Turn Left at Intersection About ○○m Ahead" |
| | 2 | Left Turn Image | "Turn Left at The Next Intersection" |
| | 3 | Straightforward Image | "Follow The Road Not Less than ○○km Ahead" |
| | 5 | Right Turn Image | "Turn Right at Intersection about ○○m Ahead" |
| | 11 | Approaching Vehicle + Left Turn Image | "Turn Left at Intersection About ○○m Ahead" |
| | 12 | No Display | "Turn Left at Intersection About ○○m Ahead" |

FIG.10

| Service Type | Number | Reproduction Ensured Period |
|---|---|---|
| 21: Route Guidance Service | 0 | 0 |
| | 1 | 5[sec] |
| | 2 | 3[sec] |
| | 3 | 5[sec] |
| | 5 | 5[sec] |
| | 11 | 5[sec] |
| | 12 | 5[sec] |

FIG.11

| Service Name | Service Type | Service Name | Service Type |
|---|---|---|---|
| Accident Mode Information Providing Service | 1 | Pedestrian Crossing Information Providing Service | 9 |
| Stop Regulation Information Providing Service | 2 | Main Line Merging Support Information Providing Service | 10 |
| Sudden Encounter Collision Information Providing Service | 3 | Rear-end Collision Prevention Information Providing Service | 11 |
| Speed Information Providing Service | 4 | Signal Information Providing Service | 12 |
| Oncoming Vehicle Approaching Information Providing Service | 5 | Reserved (for DSSS Service) | 13~20 |
| Danger Zone Avoidance Control Service | 6 | Route Guidance Service | 21 |
| Right Turn Collision Information Providing Service | 7 | Weather Information Service | 22 |
| Left Turn Catching Information Providing Service | 8 | ETC Information Service | 23 |

FIG.12

| Service Type | Number | Reproduction Image | Reproduction Voice |
|---|---|---|---|
| 3: Sudden Encounter Collision Information Providing Service | 1 | No Display | Non |
| | 3 | In Service | Non |
| | 4 | Approaching Vehicle | "Be Careful about Vehicle Approaching from Left" |
| | 11 | Approaching Vehicle | "Careful Left Approaching Vehicle" |
| | 12 | Approaching Vehicle (Route Guidance) | "Be Careful about Vehicle Approaching from Left" |
| | 13 | Approaching Vehicle (Route Guidance) | "Careful Left Approaching Vehicle" |
| | 14 | Approaching Vehicle + Left Turn Image | "Be Careful about Vehicle Approaching from Left" |
| | 15 | Approaching Vehicle + Left Turn Image | "Careful Left Approaching Vehicle" |
| | 16 | Approaching Vehicle + Left Turn Image | "Turn Left with Care about Left Approaching Vehicle" |

FIG.13

| Service Type | Number | Reproduction Ensured Period |
|---|---|---|
| 3: Sudden Encounter Collision Information Providing Service | 1 | 0 |
| | 3 | 0 |
| | 4 | 5[sec] |
| | 11 | 3[sec] |
| | 12 | 5[sec] |
| | 13 | 3[sec] |
| | 14 | 5[sec] |
| | 15 | 3[sec] |
| | 16 | 6[sec] |

FIG.25

| Voice Guidance Type | Operating Condition |
|---|---|
| Left Turn | Left Turn Signal is Being Lit |
| Right Turn | Right Turn Signal is Being Lit |
| Straightforward | Not Less than Fixed Speed |
| Congestion | Brake Lamp is Being Lit |

INFORMATION PROVIDING APPARATUS

TECHNICAL FIELD

The present invention relates to an information providing apparatus for offering information about safe-driving support.

BACKGROUND ART

A lot of collisions or slight accidents occur due to invisibility of other vehicles owing to the shape of a road or oncoming vehicles or due to misreading of a position or speed. Accordingly, a DSSS (Driver Safety Support System) receives attention which will be able to reduce accidents by using information obtained by a VICS (Vehicle Information and Communication System) (registered trademark, the mention of which will be omitted from now on) or DSRC (Dedicated Short Range Communication), and demands for implementing road/vehicle coordination service have been increasing. In addition, verification of vehicle-to-vehicle coordination services, which will be able to reduce collisions by communication between vehicles such as an ASV (Advanced Safety Vehicle), has been conducted in advanced countries.

Here, the VICS has three types: a radio beacon system using a 2.5 GHz band radio wave; an infrared beacon system using infrared rays; and an FM multiplex system using an FM radio, and traffic information is delivered from a VICS center using one of them. The DSSS employs an infrared beacon system.

In addition, the DSRC, which is called dedicated short range communication, is a technique that expands a communication technique of an ETC (Electronic Toll Collection System) (registered trademark, the mention of which will be omitted from now on). Its transmission rate reaches 4 Mbps, which is 64 times faster than the transmission rate of 64 kbps of the radio beacon system described above. Recently, using the high rate transmission technique, the next-generation road information providing service is about to be implemented such as IP (Internet Protocol) connection, charge payment at a parking lot, probing for vehicle information and safe-driving support.

As one of the DSSS, a voice guidance device is known which gives several types of information about vehicle traveling such as route information and congestion information in voice (see Patent Document 1, for example). According to the voice guidance device, it sets the degree of priority of voice information used for the voice guidance, and controls in such a manner that when a command is given to output first voice information, it makes a decision as to whether a command to output second voice information with a higher priority than the first voice information is given before the end of the output of the first voice information, and when it decides that the command to output the second voice information is not given before the end of the output of the first voice information, it outputs the first voice information, and when it decides that the command to output the second voice information is given before that, it outputs the second voice information without outputting the first voice information.

PRIOR ART DOCUMENT

Patent Document

Patent Document 1: Japanese Patent Laid-Open No. 2006-267328.

Since the conventional system using the road/vehicle or vehicle-to-vehicle communication provides an occupant with services as to the safe-driving support preferentially, during offering the route information, for example, it interrupts the output of the voice information about the route guidance and outputs the voice information about the safe-driving support, or displays the information about the safe-driving support upon an image as to the route guidance. Thus, it has a problem of giving a sense of discomfort to an occupant.

The present invention is implemented to solve the foregoing problem. Therefore it is an object of the present invention to provide an information providing apparatus capable of offering information about safe-driving support without bringing about a sense of discomfort of an occupant.

DISCLOSURE OF THE INVENTION

An information providing apparatus in accordance with the present invention is an information providing apparatus which is mounted on a mobile unit and comprises: an information communication acquiring unit for acquiring roadside information or information about another mobile unit by means of road/vehicle communication or vehicle-to-vehicle communication; an operating state detecting unit for detecting an operating state of the mobile unit; an information providing deciding unit for deciding whether to provide driving support information or not based on the information acquired by the information communication acquiring unit and vehicle side information indicating the operating state detected by the operating state detecting unit, and for commanding to output the driving support information; a route guidance unit for calculating a route up to a destination of the mobile unit and for commanding to output route guidance information; an information providing output unit for outputting voice information about the route guidance information and voice information about the driving support information; and an HMI output control unit for deciding, when the information providing deciding unit makes a decision that the driving support information is to be provided, as to whether output of the voice information about the driving support information responding to the command from the information providing deciding unit and output of the voice information about the route guidance information responding to the command from the route guidance unit overlap each other or not, and for controlling, when they overlap each other, output of voice information from the information providing output unit in a manner as to prevent the output of the voice information about the driving support information from overlapping with the output of the voice information about the route guidance information.

In addition, an information providing apparatus in accordance with the present invention is an information providing apparatus which is mounted on a mobile unit and comprises: an information communication acquiring unit for acquiring roadside information or information about another mobile unit by means of road/vehicle communication or vehicle-to-vehicle communication; an operating state detecting unit for detecting an operating state of the mobile unit; an information providing deciding unit for deciding whether to provide driving support information or not based on the information acquired by the information communication acquiring unit and vehicle side information indicating the operating state detected by the operating state detecting unit, and for commanding to output the driving support information; a route guidance unit for calculating a route up to a destination of the mobile unit and for commanding to output route guidance information; an information providing output unit for outputting image information about the route guidance information and image information about the driving support information; and an HMI output control unit for deciding, when the information providing deciding unit makes a decision that the driving support information is to be provided, as to whether output of the image information about the driving support information responding to the command from the information providing deciding unit and output of the image information about the route guidance information responding to the command from the route guidance unit overlap each other or not, and for controlling, when they overlap each other, output of image information from the information providing output unit in a manner as to prevent the image information about the driving support information from being superimposed on the image information about the route guidance information.

Furthermore, an information providing apparatus in accordance with the present invention is an information providing apparatus which is mounted on a mobile unit and comprises: an information communication acquiring unit for acquiring roadside information or information about another mobile unit by means of road/vehicle communication or vehicle-to-vehicle communication; an operating state detecting unit for detecting an operating state of the mobile unit; an information providing deciding unit for deciding whether to provide driving support information or not based on the information acquired by the information communication acquiring unit and vehicle side information indicating the operating state detected by the operating state detecting unit, and for commanding to output the driving support information; a route guidance unit for calculating a route up to a destination of the mobile unit and for commanding to output route guidance information; an information providing output unit for outputting voice information and image information about the route guidance information and voice information and image information about the driving support information; and an HMI output control unit for deciding, when the information providing deciding unit makes a decision that the driving support information is to be provided, as to whether output of the voice information and image information about the driving support information responding to the command from the information providing deciding unit and output of the voice information and image information about the route guidance information responding to the command from the route guidance unit overlap each other or not, and for controlling, when they overlap each other, output of voice information and image information from the information providing output unit in a manner as to prevent the output of the voice information and image information about the driving support information from overlapping with the output of the voice information and image information about the route guidance information.

According to the present invention, it can avoid an interruption of the voice guidance or superimposition of display images without delaying the providing timing of the information about safe-driving support. Accordingly, it can provide an occupant of the vehicle with the information about the safe-driving support without a sense of discomfort.

BRIEF DESCRIPTION OF THE DRAWINGS

FIG. 3 is a table showing service types of safe-driving support information used in the information providing apparatus of the embodiment 1 in accordance with the present invention;

FIG. 4 is a table showing an example of decision results in an information providing deciding unit of the information providing apparatus of the embodiment 1 in accordance with the present invention;

FIG. 8 is a table showing an example of a reproduction ensured period in a sudden encounter collision information providing service carried out in the information providing apparatus of the embodiment 1 in accordance with the present invention;

FIG. 9 is a table showing an output example of voice/image information about route guidance given in the information providing apparatus of the embodiment 1 in accordance with the present invention;

FIG. 10 is a table showing an example of a reproduction ensured period in a route guidance service given in the information providing apparatus of the embodiment 1 in accordance with the present invention;

FIG. 11 is a table showing an example of service types used in the information providing apparatus of the embodiment 1 in accordance with the present invention;

FIG. 12 is a table showing an example of HMI contents used in the information providing apparatus of the embodiment 1 in accordance with the present invention;

FIG. 13 is a table showing an example of a reproduction ensured period used in the information providing apparatus of the embodiment 1 in accordance with the present invention;

FIG. 25 is a table showing a setting example of operating conditions carried out in the information providing apparatus of the embodiment 3 in accordance with the present invention.

EMBODIMENTS FOR CARRYING OUT THE INVENTION

The best mode for carrying out the invention will now be described in detail with reference to the accompanying drawings.

Embodiment 1

Figure 1:
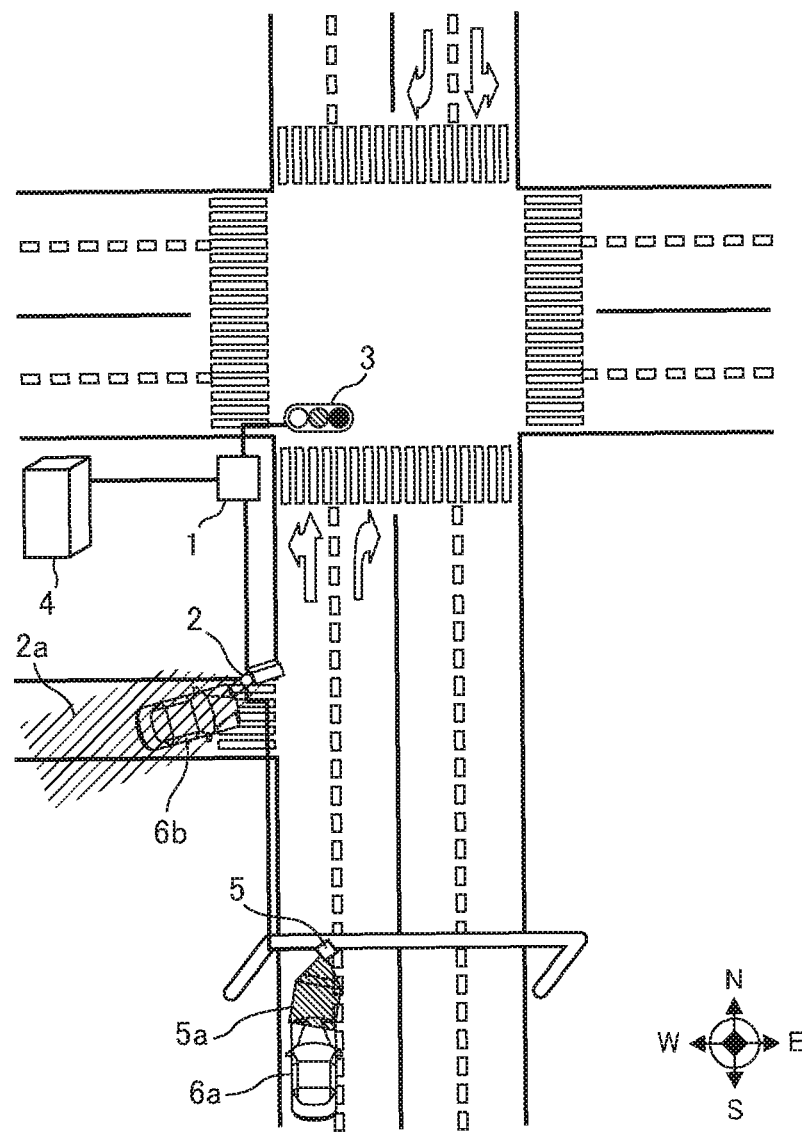
FIG. 1 is a schematic diagram showing a configuration of a road/vehicle communication system using an information providing apparatus of an embodiment 1 in accordance with the present invention.

FIG. 1 is a schematic diagram showing a configuration of a road/vehicle communication system using an information providing apparatus of an embodiment 1 in accordance with the present invention. FIG. 1 shows an example that provides information for reducing a collision on a sudden encounter of a vehicle of interest 6a with another vehicle 6b approaching from a left side stop street. Incidentally, in the following description, the same or corresponding components in the drawings are designated by the same reference numerals.

The road/vehicle communication system comprises a road/vehicle communication roadside set 1, a vehicle sensing device 2, a signal control device 3, a central device 4 and a roadside communication device 5. The road/vehicle communication roadside set 1 carries out communication with the vehicle of interest 6a and another vehicle 6b by transmitting and receiving information to and from the vehicle sensing device 2, signal control device 3, central device 4 and roadside communication device 5, thereby implementing a road/vehicle communication function.

The vehicle sensing device 2, which consists of an image sensor, for example, acquires behavioral information about the another vehicle 6b from a stop street, which approaches to the intersection of the stop street and a through street. More specifically, the vehicle sensing device 2 detects whether a vehicle is present within a vehicle sensing range 2a formed in a range of several to several tens of meters before a stop line on the stop street, acquires, if detecting a vehicle, the behavioral information (such as a detection time, detection position and speed) about the another vehicle 6b, and sends it to the road/vehicle communication roadside set 1.

The signal control device 3 controls turning on and off of lights such as blue, red and yellow lights or a right or left arrow a traffic signal possesses, and sends lighting information indicating a lighting state of the lights to the road/vehicle communication roadside set 1.

The central device 4 has road line information (such as a position of a byroad and restricted speed) indicating a shape of a road, time information, road surface information and information about surroundings such as weather information, and transmits these items of information to the road/vehicle communication roadside set 1.

The roadside communication device 5 consists of an infrared beacon, for example, and is attached to a gantry that spans the road. The roadside communication device 5 carries out near infrared communication with the information providing apparatus 6 mounted on a vehicle entering a communication area 5a with a range of about covering a driving lane (the width of about 3.5 m), encodes data the road/vehicle communication roadside set 1 possesses into a prescribed format, and transmits to the vehicle of interest 6a traveling on the left lane in the communication area 5a.

Figure 2:
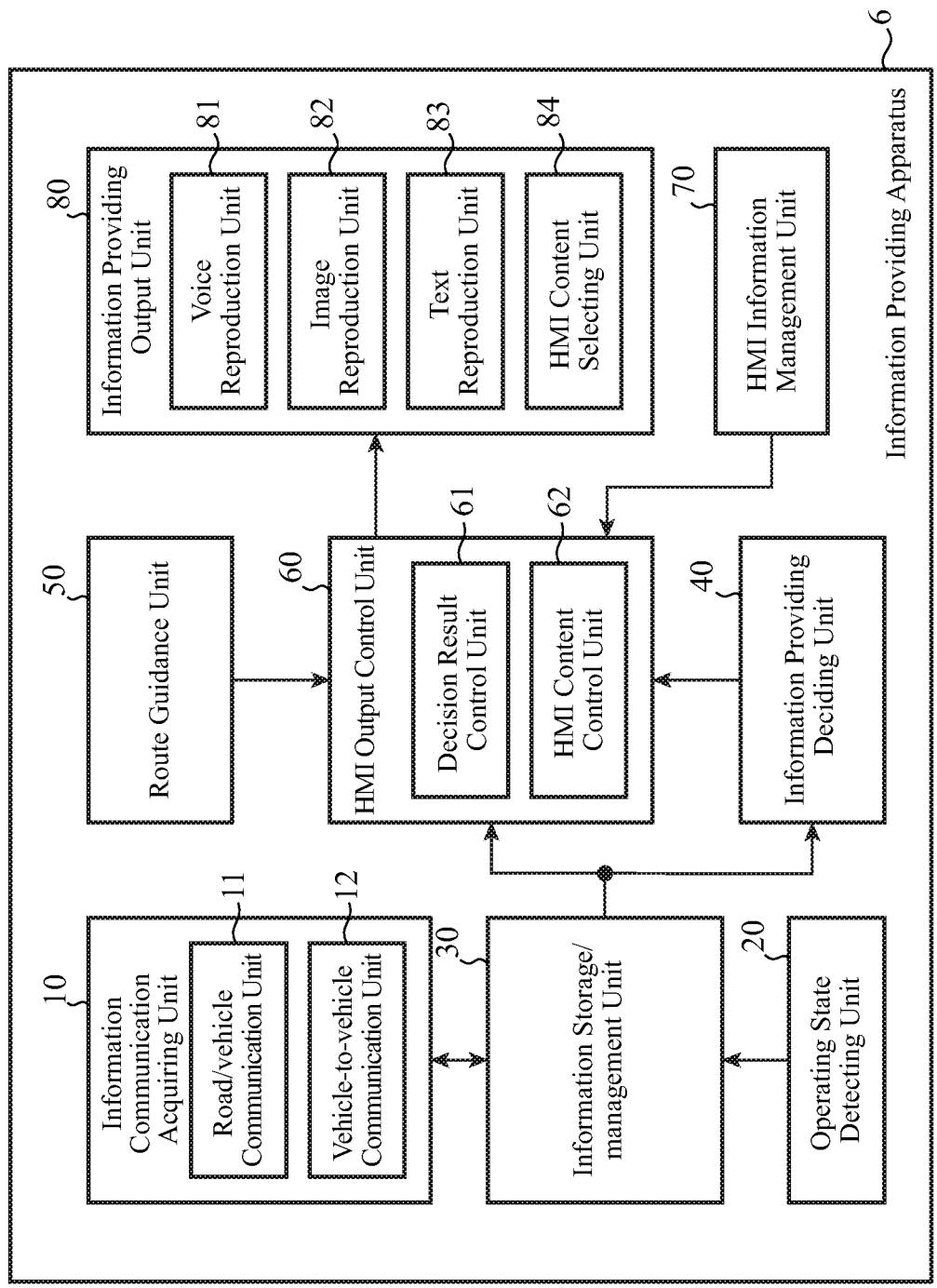
FIG. 2 is a block diagram showing a configuration of the information providing apparatus of the embodiment 1 in accordance with the present invention.

FIG. 2 is a block diagram showing a configuration of the information providing apparatus 6 of the embodiment 1 in accordance with the present invention. The information providing apparatus 6 is mounted in the vehicle as a mobile unit of the present invention. The information providing apparatus 6 comprises an information communication acquiring unit 10, an operating state detecting unit 20, an information storage/management unit 30, an information providing deciding unit 40, a route guidance unit 50, an HMI (Human Machine Interface) output control unit 60, an HMI information management unit 70 and an information providing output unit 80.

The information communication acquiring unit 10 comprises a road/vehicle communication unit 11 and a vehicle-to-vehicle communication unit 12. The road/vehicle communication unit 11 acquires road shape and signal indication information or information about neighboring vehicles by carrying out communication with the roadside communication device 5, and sends them to the information storage/management unit 30. The vehicle-to-vehicle communication unit 12 acquires the information about neighboring vehicles by carrying out communication with the another vehicle 6b, and sends it to the information storage/management unit 30.

Incidentally, as for the information providing apparatus of the present embodiment 1, although an example is described where the information communication acquiring unit 10 conducts road/vehicle communication with the roadside communication device 5, the information providing apparatus in accordance with the present invention is also applicable to a case where it carries out vehicle-to-vehicle communication with the another vehicle 6b. In this case, the information communication acquiring unit 10 transmits the information about the vehicle of interest 6a acquired from the information storage/management unit 30 to the another vehicle 6b.

The operating state detecting unit 20 detects the position, speed, azimuth, state of blinkers or brakes of the vehicle of interest 6a, and transmits them to the information storage/management unit 30 as operating state information.

The information storage/management unit 30 stores the vehicle information including type information (identifier (ID)), model, length and height of the vehicle of interest 6a, always stores the operating state information sent from the operating state detecting unit 20 and the information acquired from the outside via the information communication acquiring unit 10, and manages them by performing decoding or the like of the stored information. The information stored in the information storage/management unit 30 is offered to the roadside communication device 5 as uplink information through the communication between the roadside communication device 5 and the information communication acquiring unit 10.

From the information acquired from the information storage/management unit 30 (information acquired by the information communication acquiring unit 10 and the operating state information detected by the operating state detecting unit 20), the information providing deciding unit 40 decides whether the vehicle of interest 6a is in a state of being able to provide services or not and whether to send warning to an occupant of the vehicle of interest 6a or not for each service type, and sends the decision result to the HMI output control unit 60 as a command to output the driving support.

FIG. 3 is a table showing types of services of the safe-driving support information (referred to as "service types" from now on). The service types define types of services offered. Incidentally, as for a service type the present embodiment 1 treats, since it offers information intending to prevent a collision on a sudden encounter with the vehicle approaching from the stop street to the intersection, it corresponds to a "service type 3: sudden encounter collision information providing service" in FIG. 3.

FIG. 4 is a table showing an example of a decision result in the information providing deciding unit 40. The decision result includes a scale indicating a degree of urgency of the service type and warning information (referred to as the "degree of priority" from now on). According to the decision result and parameters acquired from the HMI information management unit 70, the HMI output control unit 60 sends an HMI output request to the information providing output unit 80, thereby offering information to an occupant of the vehicle of interest 6a.

The route guidance unit 50 creates route guidance information for showing the route to the destination set by the occupant of the vehicle of interest 6a, and transmits it to the HMI output control unit 60 as a command to output the route guidance. As for the route guidance unit 50, it will be described in more detail later.

The HMI information management unit 70 manages parameters about the HMI. The parameters managed by the HMI information management unit 70 are transmitted to the HMI output control unit 60. As for the HMI information management unit 70, it will be described in more detail later.

The HMI output control unit 60 controls the HMI in accordance with the command to output the safe-driving support acquired from the information providing deciding unit 40, the command to output the route guidance acquired from the route guidance unit 50 and parameters acquired from the HMI information management unit 70. As for the HMI output control unit 60, it will be described in more detail later.

The information providing output unit 80 offers information to an occupant of the vehicle of interest 6a in response to the HMI output request acquired from the HMI output control unit 60. As for the information providing output unit 80, it will be described in more detail later.

Figure 5:
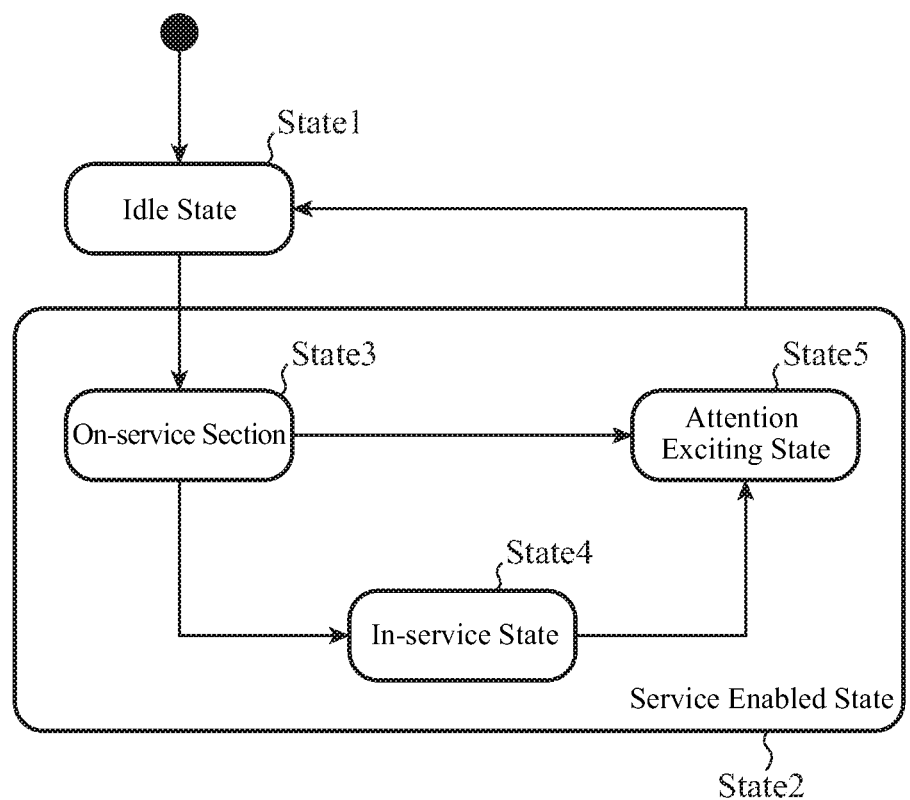
FIG. 5 is a state transition diagram showing an outline of state transition of the information providing deciding unit of the information providing apparatus of the embodiment 1 in accordance with the present invention.

Next, the operation of the information providing apparatus of the embodiment 1 in accordance with the present invention with the foregoing configuration will be described. FIG. 5 is a state transition diagram showing the outline of the state transition of the information providing deciding unit 40 of the information providing apparatus 6 in accordance with the present invention. The idle state (State 1) shows that the information providing apparatus is in a service providing disabled state such as that information necessary for the service [3: sudden encounter collision information providing service] is not present in the information storage/management unit 30 or that the information providing apparatus is passing through an intersection which is a target to be provided with the service. The service enabled state (State 2) shows that the information providing apparatus is in a service providing enabled state.

The service enabled state (State 2) has three sub-states: an on-service section state (State 3); an in-service state (State 4); and an attention exciting state (State 5). The on-service section state (State 3) shows a state other than the in-service (degree of priority 3) and attention exciting (degree of priority 4). The in-service state (State 4) shows a state in which no other vehicles are present which are to be paid attention and approach from a stop street to an intersection. The attention exciting state (State 5) shows a state in which another vehicle is present which is to be paid attention and approaches from a stop street to an intersection.

Figure 6:
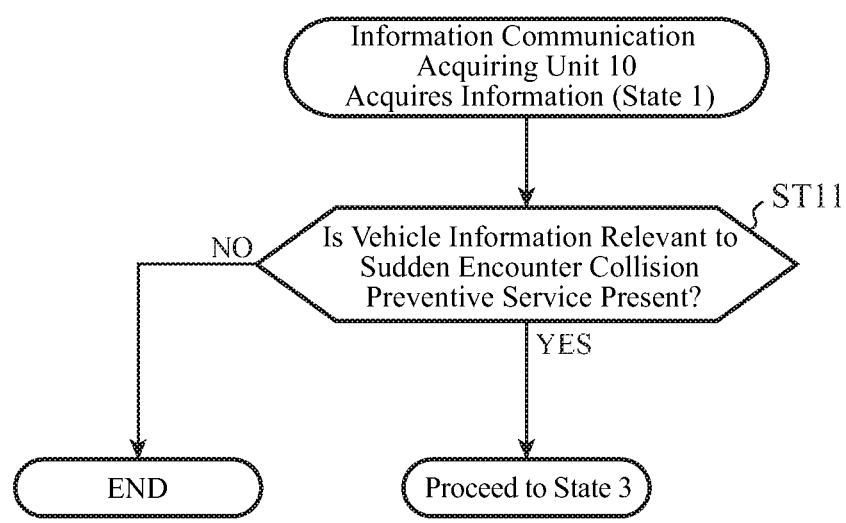
FIG. 6 is a flowchart showing the operation in an idle state (State 1) of the information providing deciding unit of the information providing apparatus of the embodiment 1 in accordance with the present invention.

FIG. 6 is a flowchart showing the operation of the information providing deciding unit 40 of the information providing apparatus 6 of the embodiment 1 in accordance with the present invention in the idle state (State 1). The processing shown in FIG. 6 makes a decision as to whether the vehicle of interest 6a which approaches from the through street to the intersection has already acquired information necessary for the service of preventing a sudden encounter collision or not.

Specifically, when the road/vehicle communication unit 11 acquires information from the roadside communication device 5 by near infrared ray communication, it is checked whether there is vehicle information corresponding to the sudden encounter collision preventive service (step ST11). More specifically, the information providing deciding unit 40 checks whether it can acquire information about the vehicle which approaches from the stop street to the intersection from the information storage/management unit 30. If a decision is made at this step ST11 that there is no vehicle information corresponding to the sudden encounter collision preventive service, the processing is terminated (the processing is not carried out until acquiring the next information). In contrast, if a decision is made that there is vehicle information corresponding to the sudden encounter collision preventive service, the processing proceeds to the on-service section state (State 3).

Figure 7:
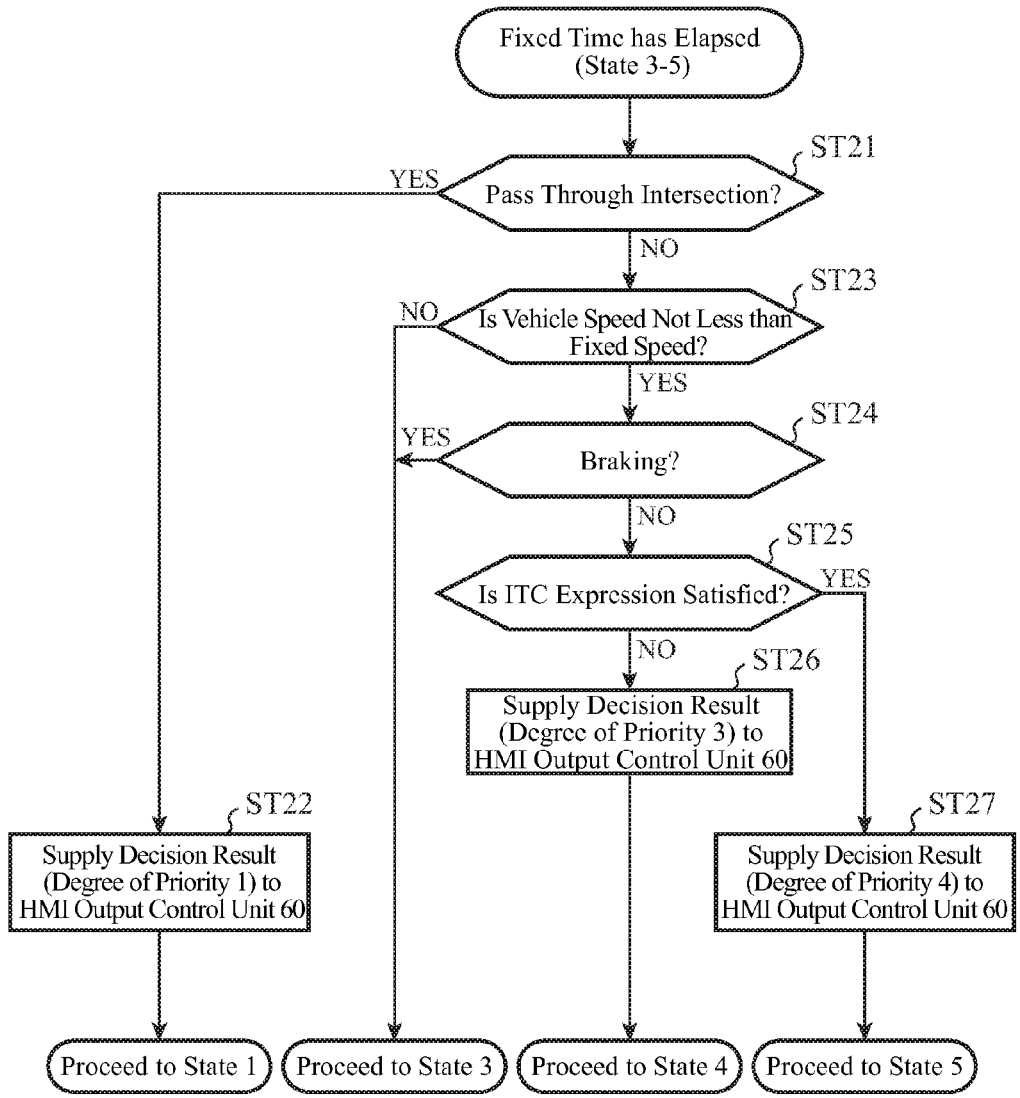
FIG. 7 is a flowchart showing the operation in a service enabled state (States 3-5) of the information providing deciding unit of the information providing apparatus of the embodiment 1 in accordance with the present invention.

FIG. 7 is a flowchart showing the operation of the information providing deciding unit 40 of the information providing apparatus 6 of the embodiment 1 in accordance with the present invention in the service enabled state (State 3-State 5). Incidentally, in the service enabled state, the processing shown in FIG. 7 is carried out at every regular interval.

When the fixed time corresponding to the regular interval has elapsed, it is checked whether the vehicle of interest 6a has passed through the intersection or not, first (step ST21). More specifically, the information providing deciding unit 40 checks whether the distance covered by the vehicle of interest 6a is greater than the distance beyond the intersection acquired from the information storage/management unit 30. If a decision is made at this step ST21 that the vehicle of interest 6a passes through the intersection, that is, that the distance covered by the vehicle of interest 6a is greater than the distance beyond the intersection acquired from the information storage/management unit 30, the end of the service is recognized, and the decision result of the degree of priority 1 is sent to the HMI output control unit 60 (step ST22). After that, the state of the information providing apparatus makes a transition to the idle state (State 1).

If a decision is made at the foregoing step ST21 that the vehicle of interest 6a has not yet passed through the intersection, a decision is made in the processing at step ST23 forward whether the vehicle of interest 6a entering the intersection is a vehicle capable of being provided with a sudden encounter collision information providing service or not. More specifically, it is checked whether the vehicle speed is not less than a particular speed or not, first (step ST23). Specifically, it is checked whether the vehicle speed is not less than a speed that can be interpreted as other than being stopped or moving slowly. If a decision is made at this step ST23 that the vehicle speed is less than the particular speed, the state of the information providing apparatus makes a transition to the on-service section state (State 3).

In contrast, if a decision is made at step ST23 that the vehicle speed is not less than the particular speed, it is checked whether the driver is using a brake or not, next (step ST24). Specifically, it is checked whether it is possible to assume that the driver has already been visually aware of the another vehicle 6b or not. If a decision is made at this step ST24 that the driver is applying the brake, the state of the information providing apparatus makes a transition to the on-service section state (State 3).

If a decision is made at the foregoing step ST24 that the driver does not apply the brake, the vehicle of interest 6a is recognized as one to which approach information of the another vehicle 6b is to be offered. After that, it is checked whether an ITC expression is satisfied or not to decide as to whether there is a possibility of causing a sudden encounter collision with the another vehicle 6b approaching from the stop street to the intersection (step ST25). More specifically, the time Tp1 taken by the another vehicle 6b, which approaches the intersection along the stop street, to arrive at the center of the intersection is compared with the time Tp2 taken by the vehicle of interest 6a, which approaches from the through street to the intersection, to arrive at the center of the intersection, and it is checked whether the following expression (1) is satisfied or not.

$$Tp1 \leq Tp2 \tag{1}$$

In this case, the time required Tp1 is obtained by Tp1=L1/V1 from the speed V1 of the another vehicle 6b the vehicle sensing device 2 detects and the distance L1 between the position of the another vehicle 6b the vehicle sensing device 2 detects and the center of the intersection. In addition, the time required Tp2 is obtained by Tp2=(L2−L3)/V2 from the speed V2 of the vehicle of interest 6a acquired from the information storage/management unit 30, the distance L2 between the roadside communication device 5 and the center of the intersection, and the distance L3 covered by the vehicle of interest 6a after the road/vehicle communication with the roadside communication device 5.

If a decision is made at this step ST25 that the ITC expression is satisfied, that is, the foregoing expression (1) holds, it is recognized that the offering of the warning information is enabled (there is danger of a collision with the another vehicle 6b), and the decision result with the degree of priority 4 is transmitted to the HMI output control unit 60 (step ST27). After that, the state of the information providing apparatus makes a transition to the attention exciting state (State 5).

In contrast, unless a decision is made at this step ST25 that the ITC expression is satisfied, that is, the foregoing expression (1) holds, it is recognized that the offering of the warning information is disabled (there is no danger of a collision with another vehicle 6b), and the decision result with the degree of priority 3 is transmitted to the HMI output control unit 60 (step ST26). After that, the state of the information providing apparatus makes a transition to the in-service state (State 4).

Next, details of the HMI output control unit 60 will be described. The HMI output control unit 60 comprises a decision result control unit 61 and an HMI content control unit 62. The decision result control unit 61 controls the output command timing of the voice information and image information (referred to as "voice/image information" from now on) for driving support in accordance with the decision result sent from the information providing deciding unit 40. The HMI content control unit 62 selects the service type and number associated with the HMI content suitable for conditions of the vehicle of interest 6a from the HMI information management unit 70 in accordance with the output command of the voice/image information for driving support and route guidance. The term "content" refers to the content of the voice/image information.

Here, details of the operation of the decision result control unit 61 of the HMI output control unit 60 will be described. The HMI output control unit 60 reserves an area for retaining output command contents and output command waiting contents, and assigns priority to the output command contents and prepares output command timing every time it acquires the decision result sent from the information providing deciding unit 40.

When the HMI output control unit 60 does not have any output command content or output command waiting content, it retains the decision result sent from the information providing deciding unit 40 as the output command content, and issues the output command of the voice/image information for driving support at the same time. In addition, the HMI output control unit 60 measures the time elapsed from the time when it retains the output command content. Incidentally, if the output command content the HMI output control unit 60 possesses is the same as the content of the decision result sent from the information providing deciding unit 40, it discards the content to avoid duplicate information providing.

FIG. 8 is a table showing an example of the reproduction ensured period in the sudden encounter collision information providing service. Here, the reproduction ensured period is a period set for preventing the information providing that will confuse the driver. For example, the time taken for outputting the voice information is assigned.

When the service type of the output command content the HMI output control unit 60 possesses and that of the decision result are the same but have a different degree of priority, the HMI output control unit 60 compares the degrees of priority and retains the content with the higher priority as the output command content. When updating the output command content, it acquires the parameter of the reproduction ensured period shown in FIG. 8 from the HMI information management unit 70, and compares it with the time elapsed after retaining the output command content. If the time elapsed is less than the reproduction ensured period, the HMI output control unit 60 updates in such a manner that the time elapsed becomes equal to the reproduction ensured period after the time has elapsed.

When acquiring a decision result corresponding to a non-display content, the HMI output control unit 60 erases the output command content regardless of the presence or absence of the output command content. In this case, it is assumed that a command to erase the voice/image information for driving support is carried out at the same time with the erasure, and the decision result is transferred to the information providing output unit 80 instead. Incidentally, in the same manner as the foregoing, when the time elapsed is less than the reproduction ensured period, it is updated after the reproduction ensured period has elapsed.

Incidentally, when the service type of the output command content the HMI output control unit 60 possesses differs from that of the decision result sent from the information providing deciding unit 40, the HMI output control unit 60 acquires the parameters of the degrees of priority of the service types from the HMI information management unit 70, compares them, and retains the service with higher priority as the output command content.

The route guidance unit 50 has a function of giving various information about traveling of the vehicle. More specifically, it has a function of displaying a road map around the position of the vehicle of interest on a monitor in the vehicle, a function of calculating a recommended route from the starting point to the destination the occupant of the vehicle of interest 6a sets, a function of carrying out route guidance in accordance with the recommended route calculated, and a function of delivering the traffic information (VICS information) provided from the traffic information communication system to the HMI output control unit 60.

FIG. 9 is a table showing an output example of the voice/image information for route guidance. Here, the route guidance has a service type and a number. In the example shown in FIG. 9, the service type of the route guidance service is 21. The information providing output unit 80 can offer information to the occupant of the vehicle of interest 6a by acquiring and playing back the voice information and image information associated with the route guidance.

FIG. 10 is a table showing an example of the reproduction ensured period in the route guidance service. The reproduction ensured periods shown in FIG. 10 are of the same type as the reproduction ensured periods shown in FIG. 8.

The HMI information management unit 70 manages parameters serving as a guideline for controlling the HMI output control unit 60. More specifically, the HMI information management unit 70 has various tables relating to the service types, HMI contents and reproduction ensured periods.

FIG. 11 is a table showing an example of the service types, FIG. 12 is a table showing an example of the HMI contents and FIG. 13 is a table showing an example of the reproduction ensured periods. According to these tables, the HMI content control unit 62 of the HMI output control unit 60 sends the service type and number associated with an HMI content to the information providing output unit 80 as the HMI output request.

In addition, the HMI information management unit 70 has parameters called an information enabled time and a shortest reproduction time. The information enabled time, which defines an enabled time during which the information providing is possible, is used in such a manner that when a fixed time has elapsed as a reproduction waiting content, the content is discarded because of the long time from a decision of the information providing deciding unit 40 that the information providing is possible to the time the information providing output unit 80 will reproduce the content. In addition, the shortest reproduction time, which defines an enabled time of provided information reproduced, is set because there are some cases of being unable to get a chance to erase the provided information in a service using information delivered singly such as information provided from the infrared beacon. After the shortest reproduction time has elapsed, the provided information is erased.

The information providing output unit 80 comprises a voice reproduction unit 81 for reproducing a voice, an image reproduction unit 82 for reproducing an image, a text reproduction unit 83 for reproducing a text and an HMI content selecting unit 84 for selecting an HMI content in response to the HMI output request. The HMI output request sent from the HMI output control unit 60 has a service type and number, and by selecting the HMI content connected thereto, the voice reproduction unit 81, image reproduction unit 82 and text reproduction unit 83 reproduce warning information such as approaching vehicle caution information or pedestrian caution information expressed in terms of a voice, image or text.

Figure 14:
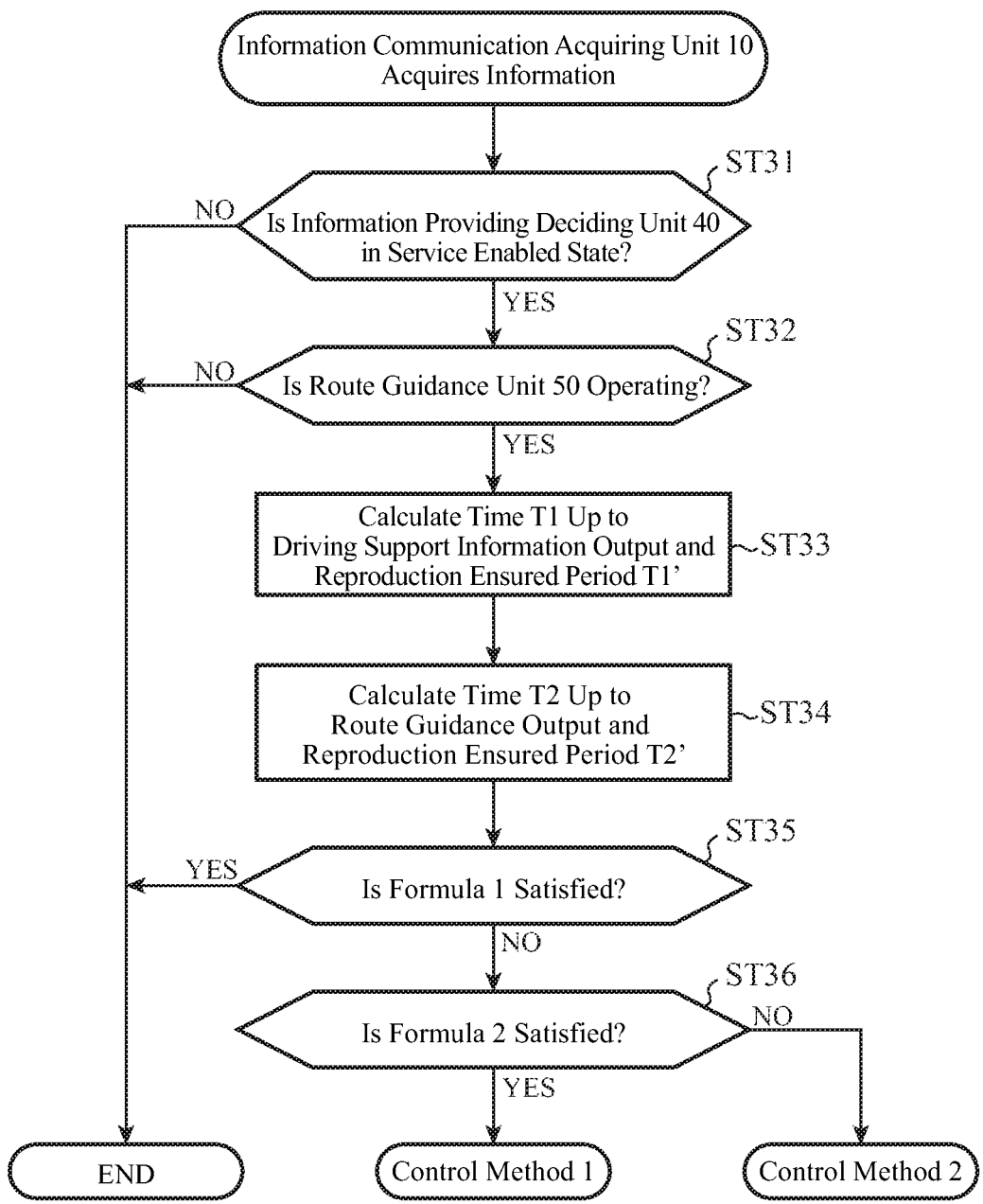
FIG. 14 is a flowchart showing the operation of an HMI output control unit of the information providing apparatus of the embodiment 1 in accordance with the present invention.

FIG. 14 is a flowchart showing the operation of the HMI output control unit 60 of the information providing apparatus 6 of the embodiment 1 in accordance with the present invention. The processing shown in the flowchart of FIG. 14 is started when the information communication acquiring unit 10 acquires information. When the processing is started, it is checked whether the information providing deciding unit 40 of the information providing apparatus mounted in the vehicle of interest 6a is in a service enabled state or not, first (step ST31). If a decision is made at this step ST31 that it is not in the service enabled state, as for the output of the voice/image information for driving support and traveling support, the HMI output control unit 60 transfers them as an HMI output request to the information providing management unit 80 without change when acquiring the command to output them, and terminates the processing.

On the other hand, if a decision is made at step ST31 that the information providing deciding unit 40 is in the service enabled state, then it is checked whether the route guidance unit 50 is operating or not (step ST32). Specifically, the HMI output control unit 60 checks whether the route guidance unit 50 is operating or not, that is, whether the occupant of the vehicle of interest 6a has set the route guidance up to the destination or not. Here, the route guidance of turning left at the next intersection is supposed as an example. If a decision is made at this step ST32 that the route guidance unit 50 is not operating, as for the output of the voice/image information for driving support and traveling support, the HMI output control unit 60 transfers them as an HMI output request to the information providing management unit 80 without change when acquiring the command to output them, and terminates the processing.

If a decision is made at the foregoing step ST32 that the route guidance unit 50 is operating, the time T1 up to the driving support information output and the reproduction ensured period T1' are calculated (step ST33). Specifically, the HMI output control unit 60 calculates the estimated time T1 until the command to output the voice/image information for driving support is issued. For example, if the distance from the vehicle of interest 6a to the intersection is 40 m, the speed of the vehicle of interest 6a is 30 km/h, the distance from the another vehicle 6b to the intersection is 30 m, and the speed of the another vehicle 6b is 20 km/h, then the time T1 is calculated as 3.6 seconds. In addition, the reproduction ensured period T1' associated with the voice/image information for driving support is acquired from the HMI information management unit 70. For example, if the voice/image information for driving support has the degree of priority 4 in the "3: sudden encounter collision information providing service", the reproduction ensured period T1' is acquired as 5 seconds.

After that, the time T2 up to the route guidance output and the reproduction ensured period T2' are calculated (step ST34). Specifically, the HMI output control unit 60 calculates the estimated time T2 up to an estimated point where the route guidance unit 50 issues a command of the route guidance. For example, when the distance from the present position of the vehicle of interest 6a to the estimated point where the route guidance is to be started is 50 m and the speed of the vehicle of interest 6a is 30 km/h, it calculates the time T2 as 6.0 seconds. In addition, the reproduction ensured period T2' associated with the route guidance information is acquired from the HMI information management unit 70. For example, when the number of the route guidance is 1, the reproduction ensured period T2' is acquired as 5 seconds.

After that, it is checked whether Formula 1 is satisfied or not (step ST35). Here, Formula 1 is given by $$T2+T2'\leq T1 \qquad (2)$$

or $$T1+T1'\leq T2 \qquad (3)$$

At step ST35, it is checked whether one of Expression (2) and Expression (3) is satisfied or not. If a decision is made at this step ST35 that Formula 1 is satisfied, the processing is terminated because the output of the voice information for driving support and that of the voice information for route guidance do not overlap each other.

In contrast, if a decision is made at step ST35 that Formula 1 is not satisfied, then it is checked whether Formula 2 is satisfied or not (step ST36). Here, Formula 2 is given by $$T2'\leq T1 \qquad (4)$$

At step ST36, it is checked whether Expression (4) is satisfied or not. If a decision is made at this step ST36 that Formula 2 is satisfied, a control method 1 is executed, and if a decision is made that Formula 2 is not satisfied, a control method 2 is executed. This can prevent the output of the voice information for driving support and that of the voice information for route guidance from overlapping each other.

The control method 1 prevents the output of the voice information for driving support and that of the voice information for route guidance from overlapping by advancing the output timing of the voice/image information for route guidance. More specifically, the voice information for driving support is output after the output of the voice information for route guidance by commanding the output of the voice/image information for route guidance before time T1–T2' has elapsed.

Figure 15:
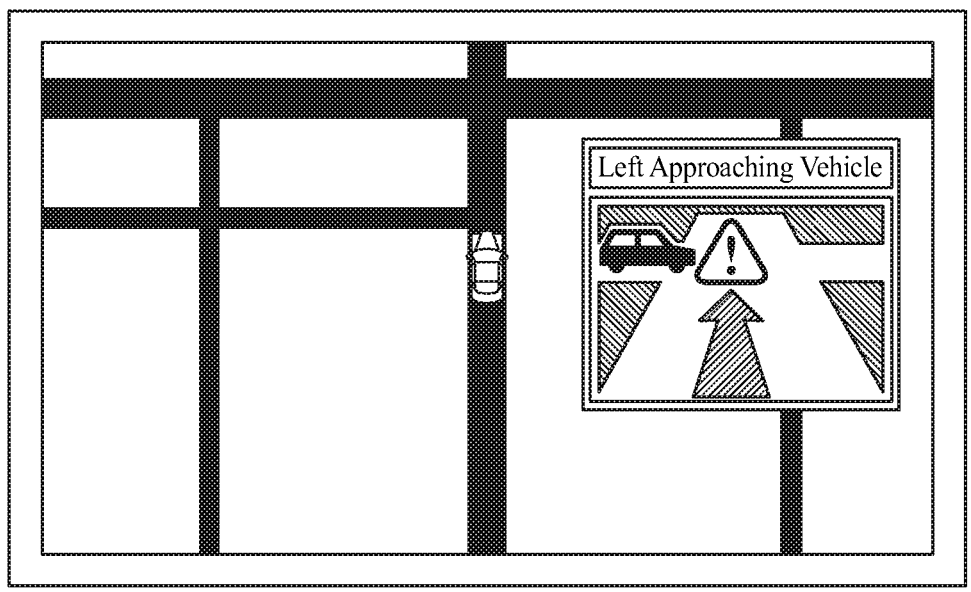
FIG. 15 is a diagram showing an example of image information about route guidance displayed on the information providing apparatus of the embodiment 1 in accordance with the present invention.
Figure 16:
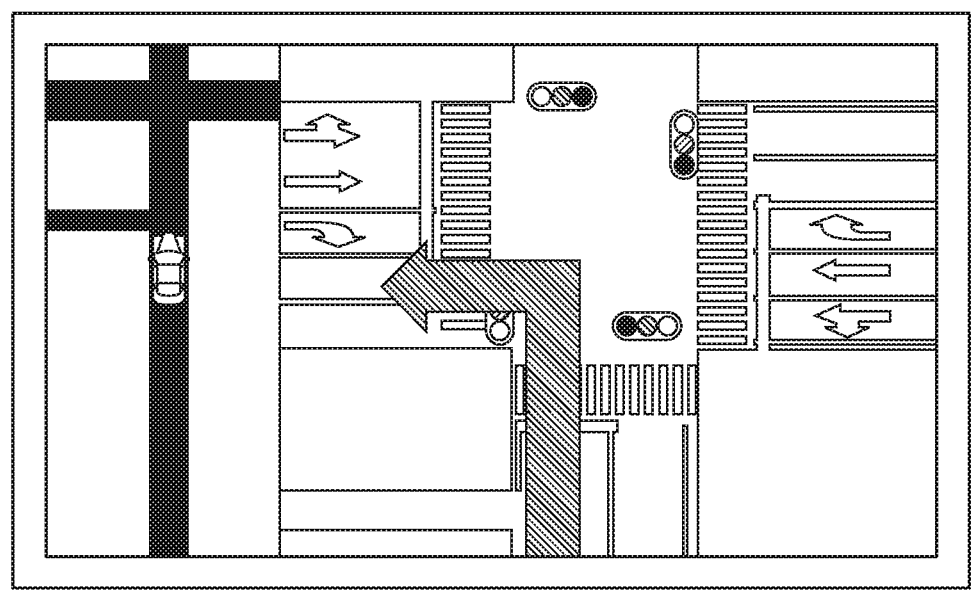
FIG. 16 is a diagram showing another example of the image information about the route guidance displayed on the information providing apparatus of the embodiment 1 in accordance with the present invention.

As for the output of the image information, a plurality of images at outputting and non-outputting the image information for route guidance are prepared as shown in FIG. 15 and FIG. 16, and the HMI output control unit 60 selects from the HMI information management unit 70 the image information which the occupant of the vehicle of interest 6a can easily perceive, and sends the HMI output request. This is because during the route guidance, since an enlarged drawing of the intersection shown in FIG. 16 is displayed, when outputting the image information for driving support as shown in FIG. 15, it is assumed that it will be difficult to perceive an enlarged drawing of the intersection.

Figure 17:
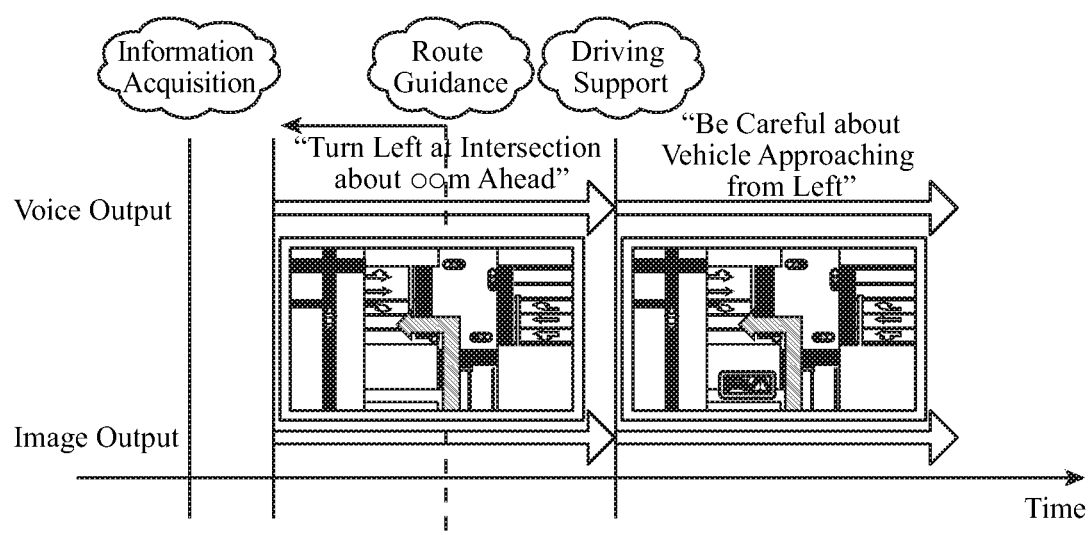
FIG. 17 is a diagram for explaining output timing of the voice/image information for route guidance output by the information providing apparatus of the embodiment 1 in accordance with the present invention.

For example, as shown in FIG. 17, the HMI output control unit 60 advances the output timing of the voice/image information for route guidance and sends the HMI output request with a service type 21 and number 1 to the information providing output unit 80. In addition, at a time when the reproduction ensured period of the HMI output request has elapsed (when T2' has elapsed) or at a time of issuing a command to output the voice/image information for driving support (when T1 has elapsed), the HMI output control unit 60 controls by sending to the information providing output unit 80 the HMI output request with a service type 3 and number 14, which is obtained by altering a reproduction image (such as an image of an approaching vehicle as shown in FIG. 15) by referring a table as shown in FIG. 12 from the HMI information management unit 70.

Alternatively, a configuration is also possible which offers image information for driving support and route guidance in synchronism with the output timing of the voice information for route guidance. The configuration can relieve a sense of discomfort given to the occupant at image switching.

The control method 2 prevents the output of the voice information for driving support and that of the voice information for route guidance from overlapping each other by delaying the output timing of the voice/image information for route guidance. More specifically, the voice information for route guidance is output after the output of the voice information for driving support by commanding the output of the voice/image information for route guidance after time T1+T1' has elapsed.

As for the output of the image information, a plurality of images at outputting and non-outputting the image information for route guidance are prepared as shown in FIG. 15 and FIG. 16, and the HMI output control unit 60 selects from the HMI information management unit 70 the image information which the occupant of the vehicle of interest 6a can easily perceive, and sends the HMI output request. This is because during the route guidance, since an enlarged drawing of the intersection shown in FIG. 16 is displayed, when outputting the image information for driving support as shown in FIG. 15, it is assumed that it will be difficult to perceive an enlarged drawing of the intersection.

Figure 18:
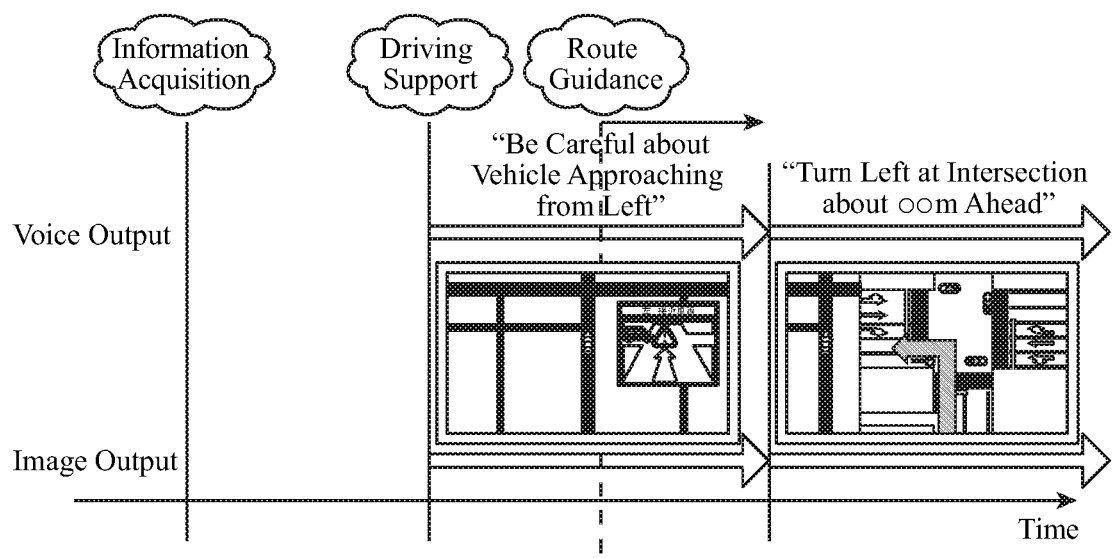
FIG. 18 is a diagram for explaining another output timing of the voice/image information for route guidance output by the information providing apparatus of the embodiment 1 in accordance with the present invention.

For example, as shown in FIG. 18, when outputting the voice/image information for driving support, the HMI output control unit 60 sends the HMI output request with a service type 3 and number 12 to the information providing output unit 80. In addition, when the reproduction ensured period of the HMI output request has elapsed (when the time T1' has elapsed), the HMI output control unit 60 delays the output timing of the voice/image information for route guidance, and sends the HMI output request to the information providing output unit 80, thereby carrying out the control. Here, as for the HMI output request of the route guidance, before the shortest reproduction time has elapsed, it consists of the service type 21 and number 11 obtained by changing the image information (such as the image of the approaching vehicle and route guidance as shown in FIG. 15) by referring to the table as shown in FIG. 9 from the HMI information management unit 70, and after the shortest reproduction time has elapsed, it consists of the service type 21 and number 1.

In addition, a configuration is also possible which commands to output the image information for driving support and route guidance in synchronism with the output of the voice information for driving support. This is because when the image information for driving support has been output before the image information for route guidance, as long as during the shortest reproduction time, it is necessary to transmit a command to update the output of the image information for driving support when commanding to output the voice/image information for route guidance, thereby complicating the control contents. This enables relieving the sense of discomfort to the occupant at the image switching.

Figure 19:
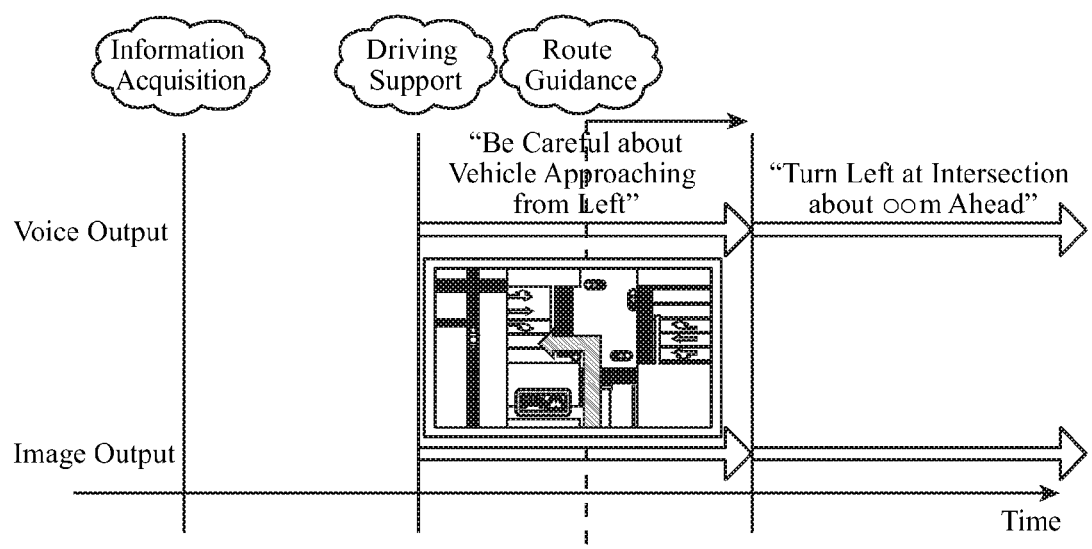
FIG. 19 is a diagram for explaining still another output timing of the voice/image information for route guidance output by the information providing apparatus of the embodiment 1 in accordance with the present invention.

For example, as shown in FIG. 19, when outputting the voice/image information for driving support, the HMI output control unit 60 refers to the table as shown in FIG. 12 from the HMI information management unit 70, and sends to the information providing output unit 80 the HMI output request with a service type 3 and number 14, which is obtained by changing the image information (such as an image of the approaching vehicle and route guidance as shown in FIG. 15). In addition, when the reproduction ensured period of the HMI output request has elapsed (when T1' has elapsed), the HMI output control unit 60 delays the output timing of the voice/ image information for route guidance, refers to the table as shown in FIG. 9 from the HMI information management unit 70, and sends to the information providing output unit 80 the HMI output request with a service type 21 and number 12, which has the reproduction image changed to a non-display state, thereby carrying out the control.

Incidentally, a configuration is also possible which can prevent the output of the voice information for driving support and that of the voice information for route guidance from overlapping each other by advancing the output timing of the voice/image information for driving support. In addition, a configuration is also possible which employs the foregoing control method 2 at the same time.

Figure 20:
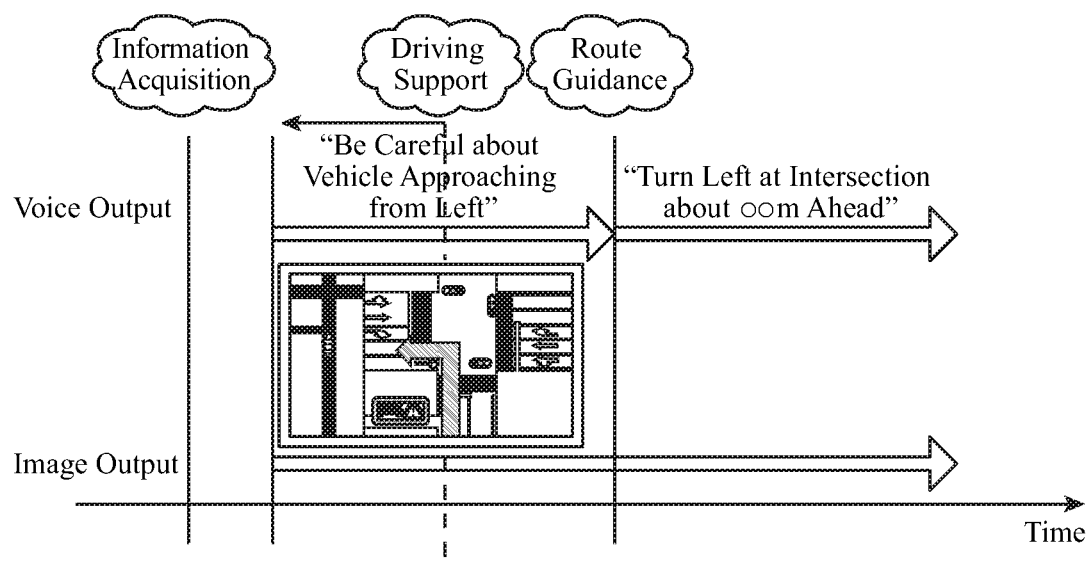
FIG. 20 is a diagram for explaining still another output timing of the voice/image information for route guidance output by the information providing apparatus of the embodiment 1 in accordance with the present invention.

For example, as shown in FIG. 20, advancing the output timing of the voice/image information for driving support, the HMI output control unit 60 refers to the table as shown in FIG. 12 from the HMI information management unit 70, and sends to the information providing output unit 80 the HMI output request with a service type 3 and number 14, which is obtained by changing the image information (such as an image of the approaching vehicle and route guidance as shown in FIG. 15). In addition, when the reproduction ensured period of the HMI output request has elapsed (when T1' has elapsed), the HMI output control unit 60 delays the output timing of the voice/image information for route guidance, refers to the table as shown in FIG. 9 from the HMI information management unit 70, and sends to the information providing output unit 80 the HMI output request with a service type 21 and number 12, which has the image information changed to a non-display state, thereby carrying out the control.

Incidentally, the information providing apparatus of the foregoing embodiment 1 is configured in such a manner as to advance or delay the output timing of route guidance when a decision is made that the output of the voice information for driving support and the output of the voice information for route guidance overlap each other. However, when a decision is made that the output of the voice information for driving support and the output of the voice information for route guidance overlap each other, it is also possible to control in such a manner as to suppress the output of the voice information for route guidance.

As described above, according to the information providing apparatus of the embodiment 1 in accordance with the present invention, it decides, when acquiring the driving support information, as to whether the output of the voice information for driving support and that of the voice information for route guidance overlap each other, and when it decides that they overlap each other, it controls in such a manner as to advance or delay the output timing of the voice/image information for route guidance. Accordingly, it can reduce the sense of discomfort to the occupant of the vehicle.

Embodiment 2

The information providing apparatus of an embodiment 2 has a configuration that can prevent the voice information for driving support and the voice information for route guidance from overlapping each other by commanding to output a content which is obtained by changing the content of the voice information for driving support or the voice information for route guidance, which is an example of the control method of the HMI output control unit 60. The configuration and operation of the information providing apparatus of the present embodiment 2 and those of a road/vehicle communication system using the apparatus are the same as those of the information providing apparatus of the embodiment 1.

Figure 21:
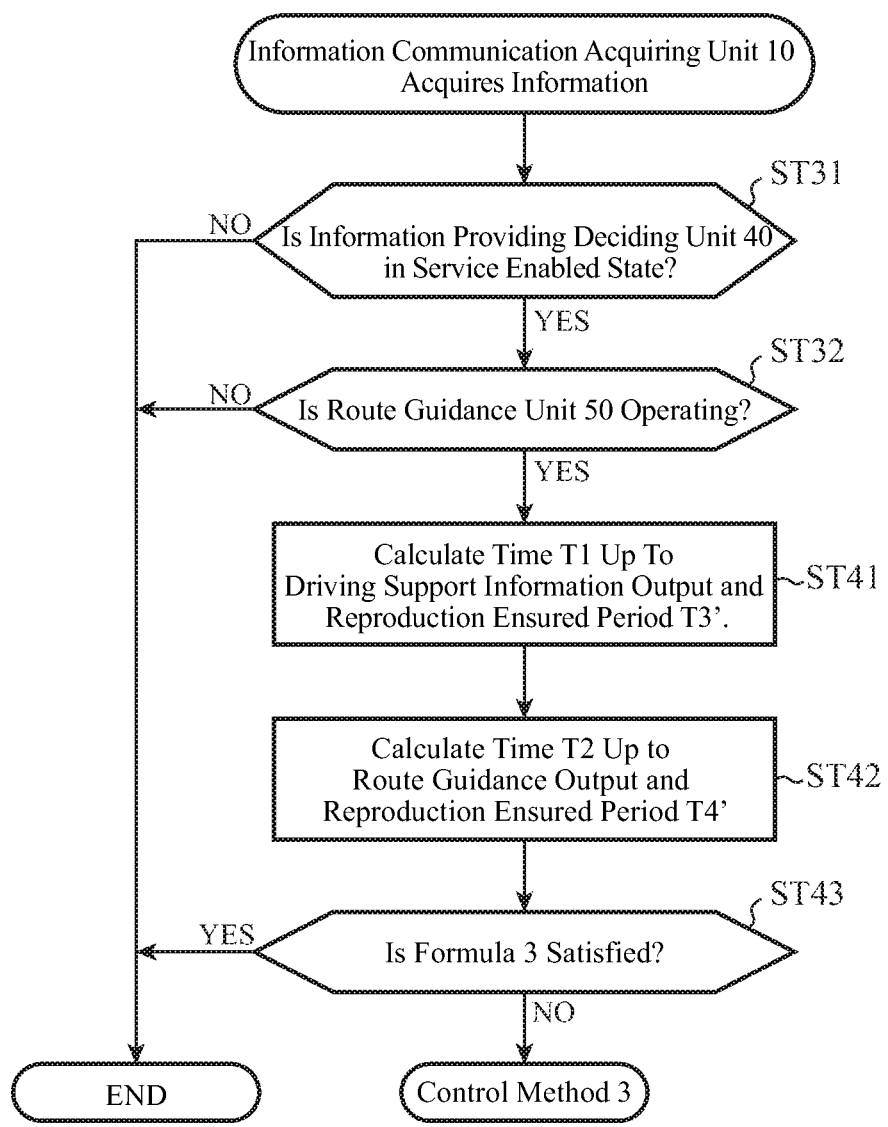
FIG. 21 is a flowchart showing the operation of the HMI output control unit of an information providing apparatus of an embodiment 2 in accordance with the present invention.

FIG. 21 is a flowchart showing the operation of the HMI output control unit 60 of the information providing apparatus of the embodiment 2 in accordance with the present invention. Incidentally, as for the steps executing the same processing as the processing of the HMI output control unit 60 of the information providing apparatus of the embodiment 1 shown in the flowchart of FIG. 14, they are designated by the same reference symbols as those shown in FIG. 14 and their description will be omitted to make the following description simpler.

The processing shown in the flowchart of FIG. 21 is started when the information communication acquiring unit 10 acquires information. When the processing is started, it is checked whether the information providing deciding unit 40 of the information providing apparatus mounted in the vehicle of interest 6a is in a service enabled state or not, first (step ST31). If a decision is made at this step ST31 that it is not in the service enabled state, the processing is terminated.

In contrast, if a decision is made at step ST31 that it is in the service enabled state, then it is checked whether the route guidance unit 50 is operating or not (step ST32). If a decision is made at this step ST32 that the route guidance unit 50 is not operating, the processing is terminated.

On the other hand, when a decision is made at the foregoing step ST32 that the route guidance unit 50 is operating, then the time T1 up to the driving support information output and the reproduction ensured period T3' are calculated (step ST41). Specifically, the HMI output control unit 60 calculates the estimated time T1 until the command to output the voice/image information for driving support is issued. For example, if the distance from the vehicle of interest 6a to the intersection is 40 m, the speed of the vehicle of interest 6a is 30 km/h, the distance from the another vehicle 6b to the intersection is 30 m, and the vehicle speed of the another vehicle 6b is 20 km/h, then the time T1 is calculated as 3.6 seconds. In addition, the reproduction ensured period T3' associated with the voice/image information for driving support is acquired from the HMI information management unit 70. For example, if the voice/image information for driving support has the degree of priority 4 in the "3: sudden encounter collision information providing service", then the HMI output control unit 60 refers to the table as shown in FIG. 12, and changes the service to the service with a service type 3 and number 11, which has the voice information with the same meaning as the foregoing voice information and with a shorter reproduction ensured period. In this case, the reproduction ensured period T3' is acquired as 3 seconds.

After that, the time T2 up to the route guidance output and the reproduction ensured period T4' are calculated (step ST42). Specifically, when the route guidance is commanded, the HMI output control unit 60 calculates the estimated time T2 up to the estimated point. For example, when the route guidance is started from the present position of the vehicle of interest 6a, and if the distance to the estimated point is 50 m and the speed of the vehicle of interest 6a is 30 km/h, then the time T2 is calculated as 6.0 seconds. In addition, the reproduction ensured period T4' associated with the route guidance is acquired from the HMI information management unit 70. For example, when the route guidance has the number 1, the HMI output control unit 60 refers to the table as shown in FIG. 9, and changes the service to the service with a number 2, which has the voice information with the same meaning and with a shorter reproduction ensured period. In this case, the reproduction ensured period T4' is acquired as 3 seconds.

After that, it is checked whether Formula 3 is satisfied or not (step ST43). Here, Formula 3 refers to $$T2+T4' \leq T1 \quad (4)$$

or $$T1+T3' \leq T2 \quad (5)$$

At this step ST43, it is checked whether Expression (4) or Expression (5) is satisfied or not. If a decision is made at this step ST43 that Formula 3 is satisfied, then the overlap of the output timing of the voice information for driving support and that of the voice information for route guidance can be avoided. As a result, it is possible to send the command to the information providing management unit 80 when a command is acquired to output the voice/image information for driving support and route guidance. If a decision is made that Formula 3 is not satisfied, a control method 3 is executed.

Incidentally, as for the processing at step ST41 and step ST43, these steps can be replaced by step ST33 and step ST34 in the flowchart shown in FIG. 14, and can be utilized with the foregoing control method 1 and control method 2 at the same time.

Figure 22:
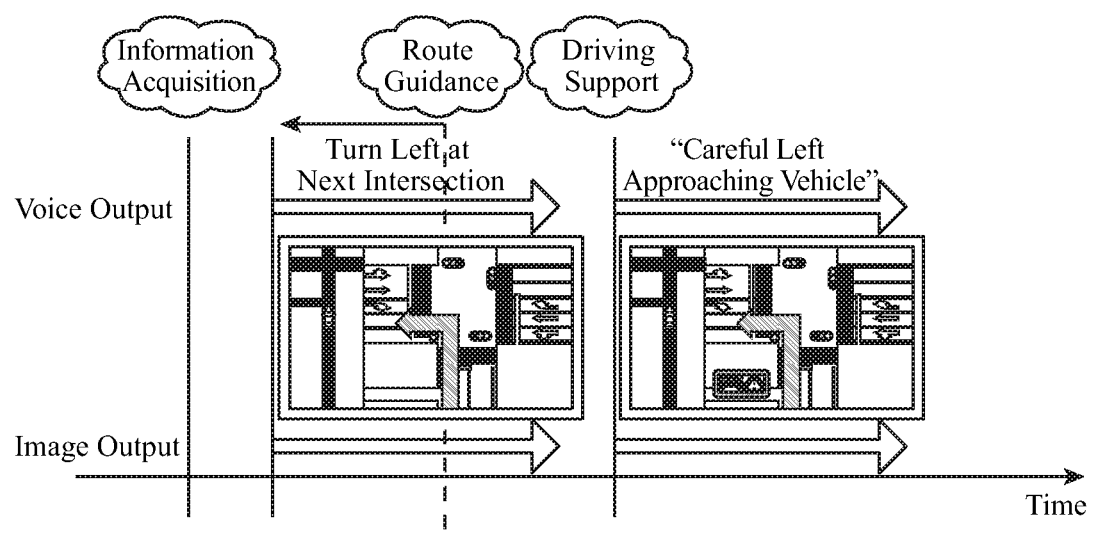
FIG. 22 is a diagram for explaining output timing of the voice/image information for route guidance output by the information providing apparatus of the embodiment 2 in accordance with the present invention.

FIG. 22 shows an example that utilizes the control method at step ST41 to step ST43 together with the control method 1. The HMI output control unit 60 advances the output timing of the voice/image information for route guidance, refers to the table as shown in FIG. 9 from the HMI information management unit 70, and sends to the information providing output unit 80 the HMI output request with a service type 21 and number 2, which is obtained by changing the voice information. In addition, when the reproduction ensured period of the HMI output request has elapsed (T4' has elapsed) or when the output timing of the voice/image information for driving support has come (T1 has elapsed), the HMI output control unit 60 refers to the table as shown in FIG. 12 from the HMI information management unit 70, and sends to the information providing output unit 80 the HMI output request with a service type 3 and number 15, which is obtained by changing the image information (such as an image of the approaching vehicle as shown in FIG. 15) and the voice information, thereby carrying out control.

The control method 3 is one that prevents the output of the voice information for driving support and that of the voice information for route guidance from overlapping each other by changing the voice information for driving support and the voice information for route guidance to voice information with the same meaning as the voice information for driving support and the voice information for route guidance.

Figure 23:
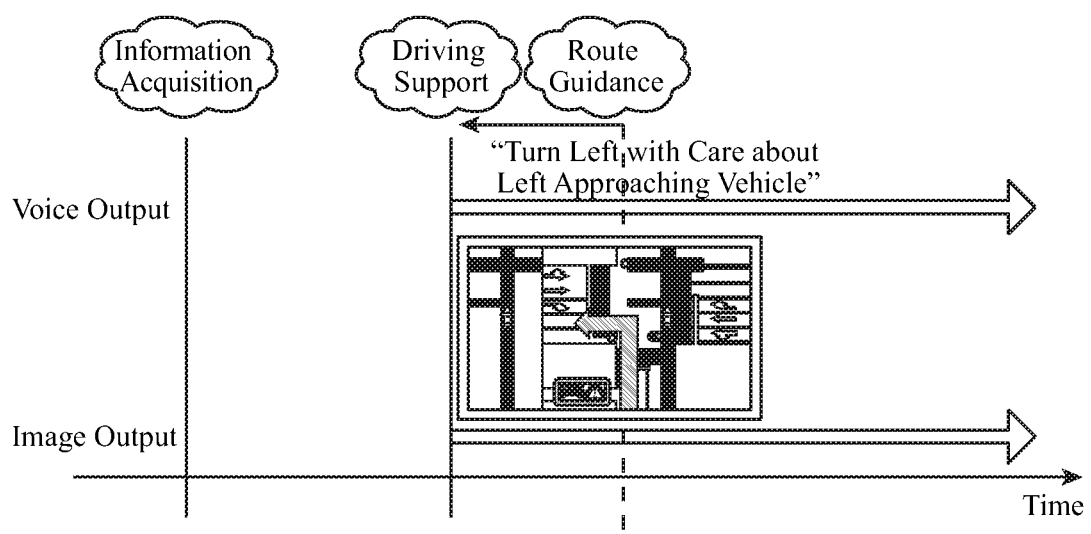
FIG. 23 is a diagram for showing another example of the voice/image information for route guidance output by the information providing apparatus of the embodiment 2 in accordance with the present invention.

For example, as shown in FIG. 23, in synchronism with the earlier output timing between the voice/image information for driving support and the voice/image information for route guidance, the HMI output control unit 60 refers to the table as shown in FIG. 12 from the HMI information management unit 70, and sends to information providing output unit 80 the HMI output request with a service type 3 and number 16, which has the image information (such as an image of the approaching vehicle and route guidance as shown in FIG. 15, for example) and the voice information changed, thereby carrying out control.

As described above, according to the information providing apparatus of the embodiment 2 in accordance with the present invention, it decides, when acquiring the information for driving support, whether the output of the voice information for driving support and the output of the voice information for route guidance overlap or not, and controls, when deciding that they overlap, in such a manner as to change the voice/image information for driving support and the voice/image information for route guidance. Accordingly, it can reduce a sense of discomfort given to the occupant of the vehicle.

Incidentally, as for the information providing apparatus of the foregoing embodiment 1 or embodiment 2, although the description is made using an example in which the information communication acquiring unit 10 acquires information by means of road/vehicle communication, a configuration is also possible which starts the above-mentioned control when it acquires information by means of vehicle-to-vehicle communication. Accordingly, it can deal with a case of road/vehicle/vehicle communication, that is, a case of acquiring information acquired by means of road/vehicle communication from another vehicle by means of vehicle-to-vehicle communication.

In addition, as for the information providing apparatus of the foregoing embodiment 1 or the embodiment 2, although the description is made by way of example in which the output of the voice information for route guidance and the output of the voice information for driving support overlap each other, it is also applicable to the voice information about traffic information, weather information or ETC charge information instead of the route guidance.

Embodiment 3

The information providing apparatus of an embodiment 3 has a configuration that can prevent the output of the voice information for driving support and the output of the voice information for route guidance from overlapping each other by controlling in such a manner as to suppress outputting the voice information for route guidance, which is one of the control methods of the HMI output control unit 60. As for the configuration and operation of the information providing apparatus of the present embodiment 3 and those of a road/vehicle communication system using the same, they are the same as those of the information providing apparatus of the embodiment 1.

Figure 24:
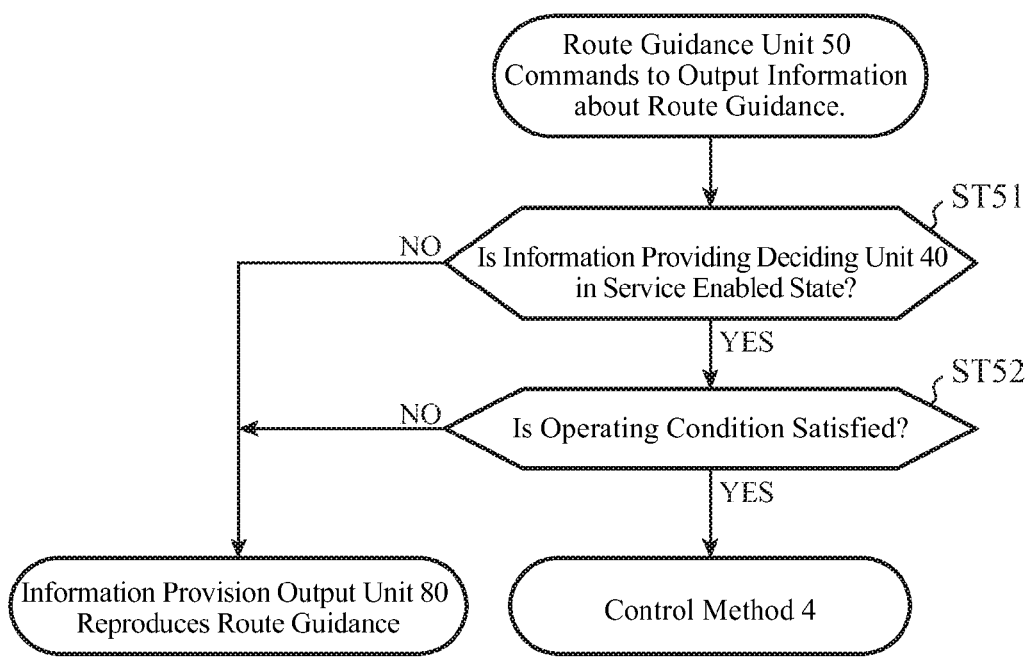
FIG. 24 is a flowchart showing the operation of the HMI output control unit of an information providing apparatus of an embodiment 3 in accordance with the present invention.

FIG. 24 is a flowchart showing the operation of the HMI output control unit 60 of the information providing apparatus of the embodiment 3 in accordance with the present invention. The processing shown in the flowchart of FIG. 24 is started when the HMI output control unit 60 receives a command to output the voice/image information for route guidance from the route guidance unit 50. When the processing is started, it is checked whether the information providing deciding unit 40 is in a service enabled state or not, first (step ST51). Specifically, the HMI output control unit 60 checks whether the information providing deciding unit 40 is in the service enabled state or not.

If a decision is made at this step ST51 that it is in the service enabled state, then it is checked whether the operating condition is satisfied or not (step ST52). Specifically, the HMI output control unit 60 acquires the operating condition from the HMI information management unit 70, and confirms whether the operating state meets the operating condition according to the information from the information storage/management unit 30. FIG. 25 is a table showing a setting example of operating conditions.

For example, when the voice guidance type of the route guidance is one that leads to a left turn, the HMI output control unit 60 acquires from the HMI information management unit 70 the operating condition that "the left turn signal is being lit" which can be interpreted as recognizing the necessity for the left turn, and checks whether the left turn signal state of the vehicle of interest 6a satisfies the foregoing operating condition or not from the information storage/management unit 30. Here, if a decision is made at the foregoing step ST51 that the information providing deciding unit 40 is not in the service enabled state and at the foregoing step ST52 that the left turn signal state does not satisfy the operating condition, a decision can be made that it is impossible to acquire from the information providing deciding unit 40 a command to output the driving support. Accordingly, the HMI output control unit 60 sends to the information providing output unit 80 the command to output the voice/image information for route guidance. In contrast, if a decision is made at the foregoing step ST52 that the left turn signal state satisfies the operating condition, the control method 4 which will be described below is executed.

The control method 4 is one that prevents the output of the voice information for driving support and the output of the voice information for route guidance from overlapping each other by controlling in such a manner as to suppress the output of the voice information for route guidance. Accordingly, only the image information for route guidance is output, which makes it unnecessary to alter the timing of the command to output the driving support or the contents of the voice information for the driving support.

As described above, according to the information providing apparatus of the embodiment 3 in accordance with the present invention, when it acquires the command to output the voice information for route guidance, it makes a decision on whether there is any possibility that the commanded to output the voice information for driving support is issued and on whether the operating state of the vehicle satisfies the operating condition or not, and controls in such a manner as to suppress the output of the voice information for route guidance when a decision is made that there is some possibility that the commanded to output the voice information for driving support occurs and that the operating state satisfies the operating condition. Accordingly, it can reduce the sense of discomfort given to the occupant of the vehicle.

Incidentally, although the foregoing embodiment 3 is configured in such a manner as to use the control method 4 alone, it can be used in combination with a control method of the embodiment 1 and embodiment 2.

Figure 26:
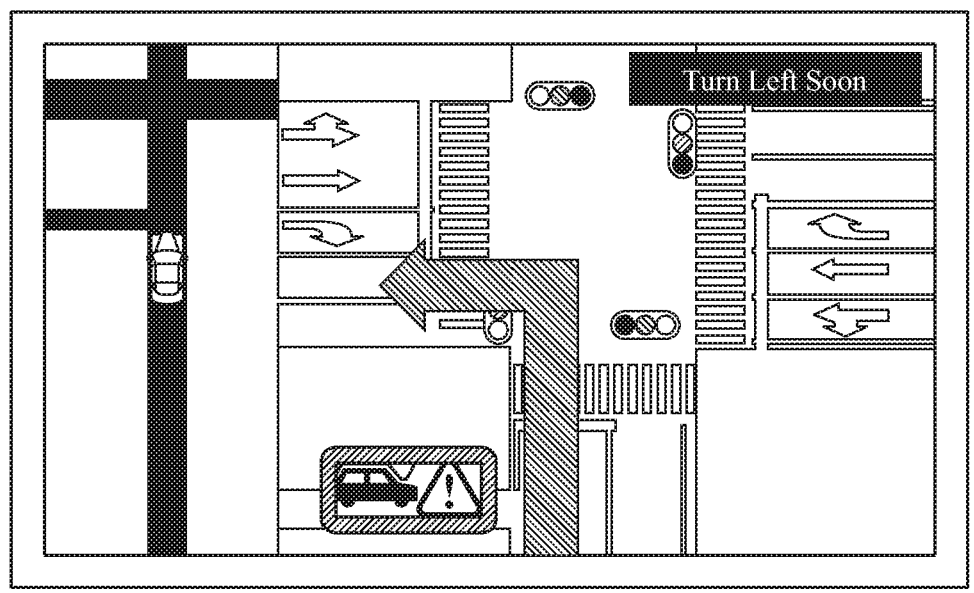
FIG. 26 is a diagram showing an example of the voice/image information for route guidance output by the information providing apparatus of the embodiment 3 in accordance with the present invention.

In addition, although the embodiment 3 is configured in such a manner as to suppress the output of the voice information for route guidance when the output of the voice information for driving support and the output of the voice information for route guidance overlap each other, it is also possible, when a decision is made that the output of the voice information for driving support and the output of the voice information for route guidance overlap each other, to control in such a manner as to output the contents of the voice information for driving support and the voice information for route guidance in the form of text information such as a telop as image information as shown in FIG. 26, for example.

The present invention is characterized by carrying out the control described in the embodiment 1 to embodiment 3 to prevent delaying the output timing of the voice/image information for driving support when a decision is made that the output of the voice information for driving support and the output of the voice information for route guidance overlap each other. As long as the characteristics and functions of the present invention can be implemented, the present invention is not limited to the information providing apparatus of the foregoing embodiments. Incidentally, the foregoing descriptions are only an example, and interpretation of the present invention is not limited or restricted at all by correspondence or relationships between the contents of the foregoing embodiments and the contents of the claims.

INDUSTRIAL APPLICABILITY

The present invention is applicable to a car navigation system which is mounted in a vehicle for carrying out route guidance.

What is claimed is:

1. An information providing apparatus which is mounted on a mobile unit, the information providing apparatus comprising:
   an information communication acquiring unit that acquires roadside information or information about another mobile unit by means of road/vehicle communication or vehicle-to-vehicle communication;
   an operating state detecting unit that detects an operating state of the mobile unit;
   an information providing deciding unit that decides whether to provide driving support information or not based on the information acquired by the information communication acquiring unit and vehicle side information indicating the operating state detected by the operating state detecting unit, and commands to output the driving support information at a first output timing;
   a route guidance unit that calculates a route up to a destination of the mobile unit and commands to output route guidance information at a second output timing;
   an information providing output unit that outputs voice information about the route guidance information and voice information about the driving support information; and
   an Human Machine Interface (HMI) output control unit that performs the following operations when the information providing deciding unit makes a decision that the driving support information is to be provided:
      determining a time by which the voice information about the driving support information is to be provided regardless of the second output timing of the voice information about the route guidance information,
      deciding whether a conflict exists between the first and second output timings of the voice information about the driving support information and the route guidance information, respectively, by determining if the output of the voice information about the driving support information responding to the command from the information providing deciding unit would overlap with the output of the voice information about the route guidance information responding to the command from the route guidance unit, and
      if a conflict is decided to exist, controlling the output of voice information from the information providing output unit in a manner as to prevent the output of the voice information about the driving support information from overlapping with the output of the voice information about the route guidance information, while ensuring that the output of the voice information about the driving support information occurs no later than the determined time.

2. The information providing apparatus according to claim 1, wherein
   the HMI output control unit controls, when the output of the voice information about the driving support information responding to the command from the information providing deciding unit and the output of the voice information about the route guidance information responding to the command from the route guidance unit overlap each other, the information providing output unit in a manner as to advance output timing of the voice information about the route guidance information and to output the voice information about the driving support information after the output of the voice information about the route guidance information.

3. The information providing apparatus according to claim 1, wherein
the HMI output control unit controls, when the output of the voice information about the driving support information responding to the command from the information providing deciding unit and the output of the voice information about the route guidance information responding to the command from the route guidance unit overlap each other, the information providing output unit in a manner as to delay output timing of the voice information about the route guidance information and to output the voice information about the route guidance information after the output of the voice information about the driving support information.

4. The information providing apparatus according to claim 1, wherein
the HMI output control unit controls, when the output of the voice information about the driving support information responding to the command from the information providing deciding unit and the output of the voice information about the route guidance information responding to the command from the route guidance unit overlap each other, the information providing output unit in a manner as to advance output timing of the voice information about the driving support information and to output the voice information about the route guidance information after the output of the voice information about the driving support information.

5. The information providing apparatus according to claim 1, wherein
the HMI output control unit controls, when the output of the voice information about the driving support information responding to the command from the information providing deciding unit and the output of the voice information about the route guidance information responding to the command from the route guidance unit overlap each other, the information providing output unit in a manner as to delay output timing of the voice information about the driving support information and to output the voice information about the driving support information after the output of the voice information about the route guidance information.

6. The information providing apparatus according to claim 1, wherein
the HMI output control unit controls, when the output of the voice information about the driving support information responding to the command from the information providing deciding unit and the output of the voice information about the route guidance information responding to the command from the route guidance unit overlap each other, the information providing output unit in a manner as to output voice information which has the same meaning as the voice information about the driving support information or the voice information about the route guidance information and which takes a period of time shorter than a period of time required for outputting the voice information about the driving support information or about the route guidance information.

7. The information providing apparatus according to claim 1, wherein
the HMI output control unit controls, when the output of the voice information about the driving support information responding to the command from the information providing deciding unit and the output of the voice information about the route guidance information responding to the command from the route guidance unit overlap each other, the information providing output unit in a manner as to output a single piece of voice information which includes a meaning of the voice information about the driving support information and a meaning of the voice information about the route guidance information.

8. The information providing apparatus according to claim 1, wherein
the HMI output control unit controls, when the output of the voice information about the driving support information responding to the command from the information providing deciding unit and the output of the voice information about the route guidance information responding to the command from the route guidance unit overlap each other, the information providing output unit in a manner as to output text information which has the same meaning as the voice information about the driving support information or the voice information about the route guidance information in a form of image information.

9. The information providing apparatus according to claim 1, wherein
the HMI output control unit decides, when receiving a command to output the voice information about the route guidance information from the route guidance unit, as to whether the operating state of the mobile unit detected by the operating state detecting unit satisfies an operating condition corresponding to a content of the voice information about the route guidance information or not, followed by deciding in accordance with the decision result as to whether the output of the voice information about the driving support information can be commanded or not, and controls, when deciding that the output of the voice information about the driving support information can be commanded, the information providing output unit in a manner as to suppress the output of the voice information about the route guidance information.

10. An information providing apparatus which is mounted on a mobile unit, the information providing apparatus comprising:
an information communication acquiring unit that acquires roadside information or information about another mobile unit by means of road/vehicle communication or vehicle-to-vehicle communication;
an operating state detecting unit that detects an operating state of the mobile unit;
an information providing deciding unit that decides whether to provide driving support information or not based on the information acquired by the information communication acquiring unit and vehicle side information indicating the operating state detected by the operating state detecting unit, and commands to output the driving support information at a first timing;
a route guidance unit that calculates a route up to a destination of the mobile unit and commands to output route guidance information at a second timing;
an information providing output unit that outputs image information about the route guidance information and image information about the driving support information; and
an Human Machine Interface (HMI) output control unit that performs the following operations when the information providing deciding unit makes a decision that the driving support information is to be provided:
  determining a time by which the image information about the driving support information is to be provided regardless of the second output timing of the image information about the route guidance information,
  deciding whether a conflict exists between the first and second output timings of the image information about the driving support information and the route guidance information, respectively, by determining if the output of the image information about the driving support information responding to the command from the information providing deciding unit would overlap with the output of the image information about the route guidance information responding to the command from the route guidance unit, and
  if a conflict is decided to exist, controlling the output of image information from the information providing output unit in a manner as to prevent the image information about the driving support information from being superimposed on the image information about the route guidance information, while ensuring that the output of the image information about the driving support information occurs no later than the determined time.

11. The information providing apparatus according to claim 10, wherein
  the HMI output control unit controls, when the output of the image information about the driving support information responding to the command from the information providing deciding unit and the output of the image information about the route guidance information responding to the command from the route guidance unit overlap each other, the information providing output unit in a manner as to output image information including the image information about the route guidance information and a display content of the image information about the driving support information.

12. An information providing apparatus which is mounted on a mobile unit, the information providing apparatus comprising:
  an information communication acquiring unit that acquires roadside information or information about another mobile unit by means of road/vehicle communication or vehicle-to-vehicle communication;
  an operating state detecting unit that detects an operating state of the mobile unit;
  an information providing deciding unit that decides whether to provide driving support information or not based on the information acquired by the information communication acquiring unit and vehicle side information indicating the operating state detected by the operating state detecting unit, and commands to output the driving support information;
  a route guidance unit that calculates a route up to a destination of the mobile unit and commands to output route guidance information;
  an information providing output unit that outputs voice information about the route guidance information and voice information about the driving support information; and
  an Human Machine Interface (HMI) output control unit that decides, when the information providing deciding unit makes a decision that the driving support information is to be provided, whether an output of the voice information about the driving support information responding to the command from the information providing deciding unit and an output of the voice information about the route guidance information responding to the command from the route guidance unit overlap each other or not, and controls, when they overlap each other, the output of voice information from the information providing output unit in a manner as to prevent the output of the voice information about the driving support information from overlapping with the output of the voice information about the route guidance information,
  wherein the HMI output control unit decides, when receiving a command to output the voice information about the route guidance information from the route guidance unit, whether or not the operating state of the mobile unit detected by the operating state detecting unit satisfies any one of operating conditions consisting of left turning, right turning, and applying a brake, decides whether or not the output of the voice information about the driving support information is to be commanded based on a decision result as to the operating conditions, and controls, when deciding that the output of the voice information about the driving support information is to be commanded, the information providing output unit in a manner so as to suppress the output of the voice information about the route guidance information.

13. The information providing apparatus according to claim 12, wherein
  the information providing output unit further outputs image information about the route guidance information and image information about the driving support information,
  the HMI output control unit decides, when the information providing deciding unit makes a decision that the driving support information is to be provided, whether an output of the voice information and image information about the driving support information responding to the command from the information providing deciding unit and an output of the voice information and image information about the route guidance information responding to the command from the route guidance unit overlap each other or not, and controls, when they overlap each other, the output of voice information and image information from the information providing output unit in a manner as to prevent the output of the voice information and image information about the driving support information from overlapping with the output of the voice information and image information about the route guidance information, and
  the HMI output control unit decides, when receiving a command to output the voice information about the route guidance information from the route guidance unit, whether or not the operating state of the mobile unit detected by the operating state detecting unit satisfies any one of operating conditions consisting of left turning, right turning, and applying a brake, decides whether or not the output of the voice information about the driving support information is to be commanded based on a decision result as to the operating conditions, and controls, when deciding that the output of the voice information about the driving support information is to be commanded, the information providing output unit in a manner so as to suppress the output of the voice information about the route guidance information.

* * * * *